United States Patent
Bakin et al.

(10) Patent No.: US 12,532,078 B1
(45) Date of Patent: Jan. 20, 2026

(54) USE OF ZONAL ADAPTIVE ILLUMINATION

(71) Applicant: Amazon Technologies, Inc., Seattle, WA (US)

(72) Inventors: Dmitry V Bakin, San Jose, CA (US); Samuel Lee, Los Angeles, CA (US); Alexander Bruce Gentles, Brampton (GB); Rajesh Reddy Nandyala, Cambridge (GB); Danylo Dorofeyev, Kyiv (UA); Andrii Uklein, Kyiv (UA); Andrii Shekera, Vyshneve (UA); Ilya Brailovskiy, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 18/338,245

(22) Filed: Jun. 20, 2023

(51) Int. Cl.
- *H04N 23/00* (2023.01)
- *H04N 23/56* (2023.01)
- *H04N 23/71* (2023.01)
- *H04N 23/72* (2023.01)
- *H04N 23/74* (2023.01)

(52) U.S. Cl.
CPC ............. *H04N 23/74* (2023.01); *H04N 23/56* (2023.01); *H04N 23/71* (2023.01); *H04N 23/72* (2023.01)

(58) Field of Classification Search
CPC ........ H04N 23/74; H04N 23/56; H04N 23/71; H04N 23/72
See application file for complete search history.

(56) References Cited

U.S. PATENT DOCUMENTS

| | | | |
|---|---|---|---|
| 8,619,082 B1* | 12/2013 | Ciurea | H04N 13/128 382/154 |
| 12,044,374 B2 | 7/2024 | Okahisa | |
| 2009/0008530 A1 | 1/2009 | Wernersson | |
| 2009/0022393 A1* | 1/2009 | Bar-Zohar | G06T 7/593 382/154 |

(Continued)

FOREIGN PATENT DOCUMENTS

| | | | | |
|---|---|---|---|---|
| JP | 2007096684 A | * | 4/2007 | |
| JP | 5438414 B2 | * | 3/2014 | H04N 5/2351 |

OTHER PUBLICATIONS

Foreign patent machine translation JP5438414B2.*

(Continued)

*Primary Examiner* — Frank F Huang
(74) *Attorney, Agent, or Firm* — Knobbe Martens Olson & Bear LLP

(57) ABSTRACT

Systems and methods are provided for managing illumination associated with image capture by devices by adjusting illumination in one or more sub-portions of an area during image capture. In order to adjust illumination, configuration data may be obtained relating to image data generated by an image capture device. The image capture device may be associated with a controllable illumination device configured to provide independently controllable illumination for at least two sub portions of an area. The controllable illumination device may cause the generation of illumination based on independent illumination attributes associated with the at least two sub-portions. The illumination device can include independently controllable illumination units can include a light emitting diode (LED) array in which individual LEDs in the LED array are independently controllable.

20 Claims, 18 Drawing Sheets

(56) References Cited

U.S. PATENT DOCUMENTS

| | | | |
|---|---|---|---|
| 2010/0091119 A1* | 4/2010 | Lee | H04N 23/741 |
| | | | 348/208.4 |
| 2012/0321172 A1* | 12/2012 | Jachalsky | G06T 7/593 |
| | | | 382/154 |
| 2013/0266326 A1 | 10/2013 | Joseph et al. | |
| 2013/0272582 A1* | 10/2013 | Schlosser | H04N 13/156 |
| | | | 382/107 |
| 2016/0164261 A1 | 6/2016 | Warren | |
| 2018/0157342 A1 | 6/2018 | Romano et al. | |
| 2021/0200064 A1 | 7/2021 | Van Der Sijde et al. | |
| 2023/0069917 A1 | 3/2023 | Krivopisk et al. | |
| 2024/0267602 A1 | 8/2024 | Beaudet et al. | |

OTHER PUBLICATIONS

Foreign patent machine translation.*
"Ring doorbell pro can't see a night due to infrared light reflecting off my wall", reddit.com, https://www.reddit.com/r/Ring/comments/s8m9ui/ring_doorbell_pro_cant_see_a_night_due_to/, visited Aug. 1, 2023 in 6 pages.

* cited by examiner

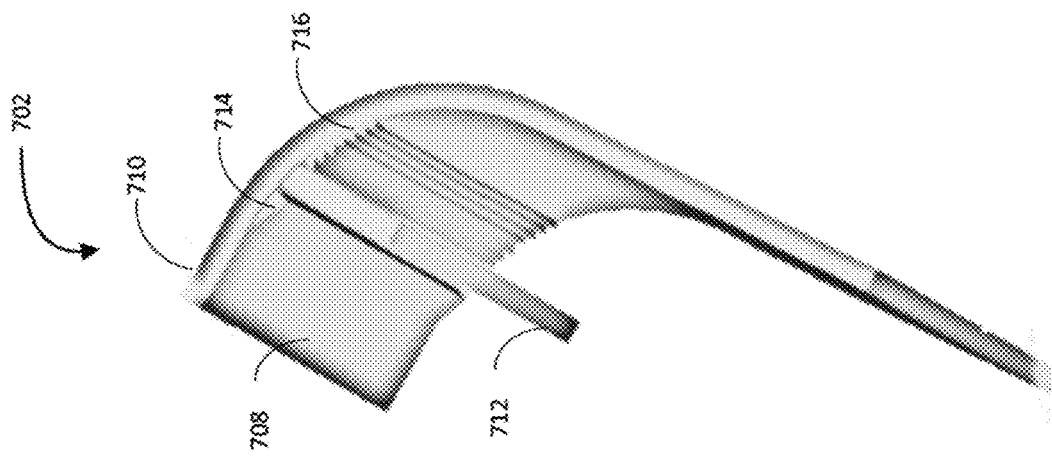
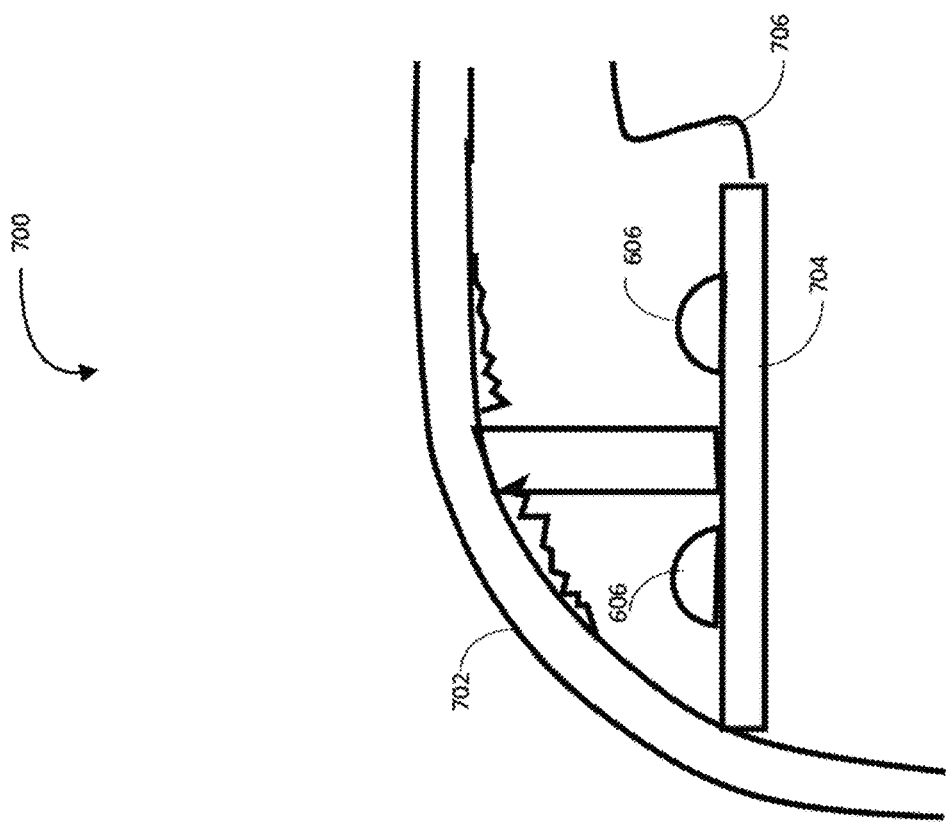
*FIG. 7B*
*FIG. 7A*

USE OF ZONAL ADAPTIVE ILLUMINATION

BACKGROUND

Generally described, image capture devices, such as video imaging devices, static/still imaging devices, etc., can be incorporated into a variety of applications and systems (e.g., security camera devices, video doorbell devices, etc.). In some applications, image capture devices can rely on natural lighting in an area (e.g., sunlight or other light sources) during image capture. Such natural sources of light may be inconsistent or temporal in nature. Accordingly, some image capture devices can be directly or indirectly configured to work with illumination components or illumination devices that provide illumination on the physical areas that are associated with captured image data (e.g., captured video image data, captured still image data, etc.) and that are captured within the field of view (FOV) of the image capture device. In certain scenarios, similar to natural lighting, the use of supplemental illumination can result in underexposed captured image data or overexposed captured image data.

Managing illumination associated with image capture, in general, often involves enhancing details in the dark and bright areas of the image data. A common technique involves capturing multiple images of the same area at different exposure levels and combining them to create one image with an expanded dynamic range. For example, an image of an area may be taken at a lower exposure level and another image may be taken at a higher exposure level. Details obtained from the lower exposure image may provide more detail in bright portions of the image and details obtained from the higher exposure image may provide more detail in darker portions of the image. Combining information from the lower exposure and higher exposure image can result in more details being captured for a combined image. There will typically be a time delay in between capture of images at different exposure levels. This technique requires that there be no significant changes to the area in the time delays between capture of the images.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

FIG. 7A-B illustrate example embodiments of an illumination device using illumination units on a substrate with an optical element configured to angle light from the illumination units.

DETAILED DESCRIPTION

Figure 1:
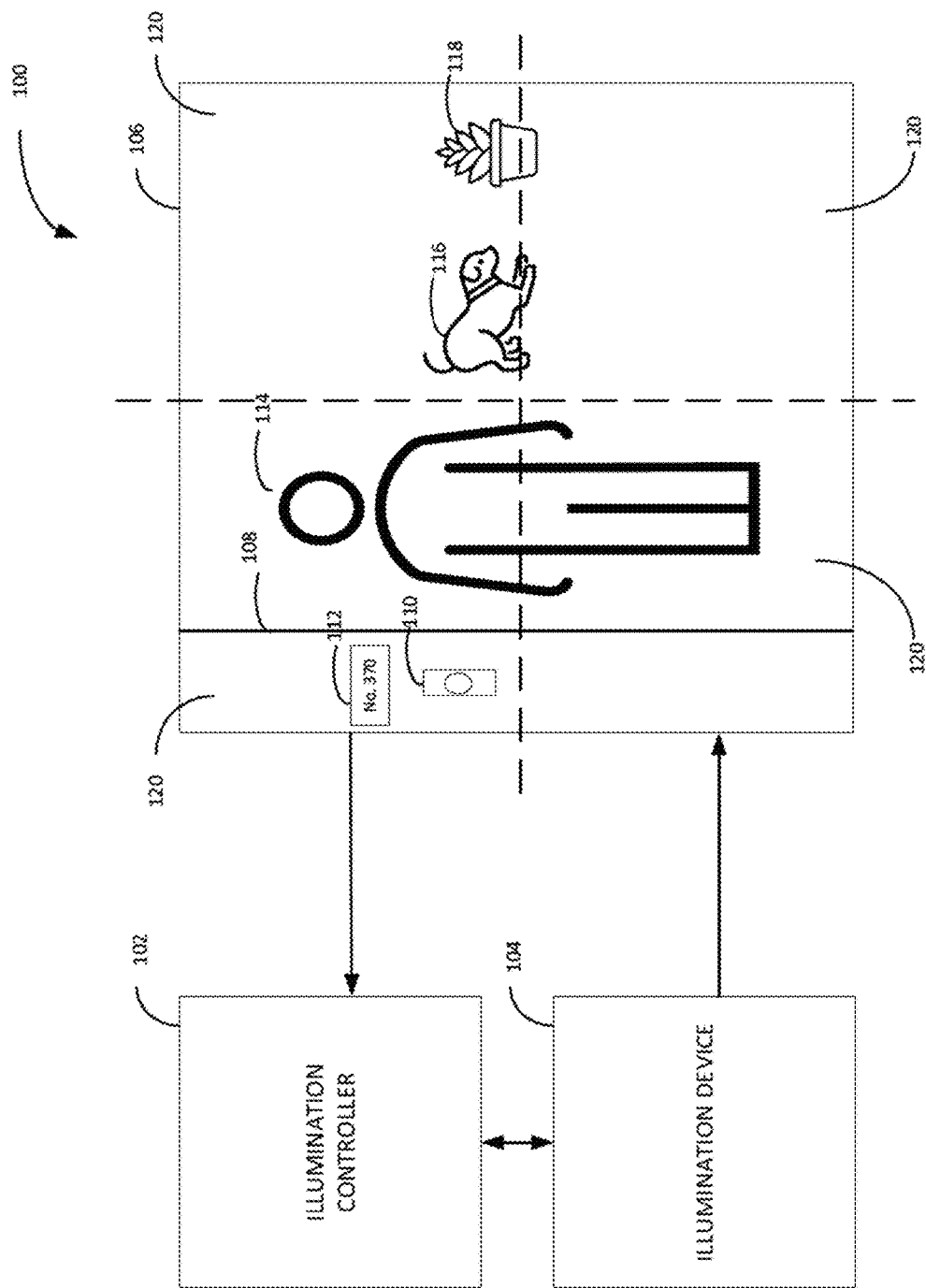
FIG. 1 illustrates an example system including an illumination control configured to dynamically adjust illumination provided by an illumination device in an image capture area.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Generally described, aspects of the present disclosure relate to managing illumination associated with image capture by adjusting illumination in a camera's field of view (FOV) in response to image data obtained from one or more sensors. More specifically, aspects of the present disclosure correspond to systems and methods for managing illumination associated with a camera's FOV to minimize loss of detail in captured images from underexposure or overexposure. As will be described in more detail below, aspects of the present disclosure correspond to the utilization of independently controllable illumination units, or light sources, to adjust illumination in independent sub-portions of a camera's FOV. In some aspects, illumination units provide independent illumination of distinct parts of the FOV with adaptable intensity.

Adjustment may utilize or be based on data or feedback generated by or obtained from one or more image sensors or image capture devices. In some aspects, data or feedback may be related to changes in illumination in a camera FOV, captured images, or an image capture area over time. The data or feedback may specify in which sub-portions of a camera FOV's and/or captured image the illumination has changed and in which sub-portions, if any, that the illumination has not changed. In some aspects, this data or feedback may be used, at least in part, to illuminate the image capture area such that some or all sub-portions of a generated image are illuminated with a similar intensity. This may improve capture of details in image data for some or all sub-portions of the image.

In accordance with other aspects of the present disclosure, the independently controllable illumination units can include a light emitting diode (LED) array including one or more LED packages. LED packages contain a light emitting diode and a cover lens. The optical center of the cover lens may determine the direction of light emitted by the LED package. For example, an on-axis LED package (also referred to as a standard LED package below) may include a light-emitting diode (LED) and a cover lens having an optical center corresponding to the physical center of the LED. This may allow light to be directed in a manner corresponding to the orientation of the LED. In contrast, an exemplary off-axis LED package may include, for example, a light emitting diode and a cover lens having an optical center that does not correspond to a physical center of the light emitting diode. Such an off-axis design allows light to be directed in a preselected direction without need to tilt an entire board or component. LED packages may be referred to later on as LED or LEDs for brevity.

In accordance with further embodiments, the independently controllable illumination units may be configured such that individual LEDs in the LED array are independently controllable. Such independent control can include the adjustment of various illumination properties or attributes, such as activation, deactivation, adjustment of brightness or luminance, and the like. The array of LEDs may be arranged according to a matrix and may also be coupled to or disposed on a substrate. The independently controllable illumination units can further be associated with additional components or configurations that facilitate the direction of light generated by the LED array, such as according to a specified or desired illumination pattern. In one example, a camera device or the independently controllable illumination units can include optical elements that are configured to direct illumination provided by one or more LEDs of an LED array according to a set of angles in relation to individual LEDs. The optical elements may refract or redirect light received at the optical element in some embodiments and/or disperse light received at the optical element in other embodiments. In another example, the independently controllable illumination units can include LEDs disposed (or arranged) on a substrate according to angles in relation to the substrate. In another example, an off-axis LED package may be configured to direct light at an angle as compared with an orientation of the LED package.

Existing systems for adjusting illumination for image capture include systems utilizing high dynamic range (HDR) methods. These methods may involve taking images at different levels of exposure within a camera's FOV encompassing an image capture area. For example, an image may be taken at a lower exposure level and another image may be taken at a higher exposure level. Details obtained from the lower exposure image may provide more detail in bright portions of the image and details obtained from the higher exposure image in darker portions of the image. Combining information from the lower exposure and higher exposure images may result in more details being captured with respect to the image capture area.

One potential deficiency associated with this approach can arise in situations when objects in the camera's FOV change position between images being collected. This creates what is commonly referred to as a "ghosting" artifact.

Other types of problems associated with improving detail captured in images include "part-wall" challenges (e.g., when part of a wall is close to the camera). In some aspects, the portion of the wall (or other obstruction) close to the camera becomes overexposed or oversaturated. For example, in some aspects, image capture may occur at night and the image capture area may be illuminated with light in the IR spectrum. This light may reflect off of the obstruction, causing a corresponding sub-portion of a captured image to appear overexposed. In some aspects, important details may be present in this sub-portion of the FOV of the image capture device (e.g., a person). A straightforward approach for correcting overexposure in this sub-portion may result in underexposure of other sub-portions resulting in loss of detail in the image data collected.

Another deficiency associated with existing technologies relates to power consumption. For example, sometimes, in order to illuminate dim areas of an image capture area, illumination is increased in all sub-portions of a camera FOV encompassing an image capture area. This may result in increased power usage by the image capture device. Where the image capture device relies on battery power, this increased power usage can result in shortened battery life or device unavailability based on insufficient power resources.

One or more approaches applied by the present disclosure improve upon deficiencies or errors of existing technologies in various ways by facilitating independent control of illumination captured in one or more sub-portions of a camera's field of view. Illustratively, adjusting illumination independently by controlling illumination applied to individual sub-portions mitigates "ghosting" artifacts by eliminating the need to capture multiple images at multiple different exposure levels. In addition, independent adjustment of illumination for individual sub-portions, according to some aspects, results in objects within the camera's field of view being illuminated at the same average intensity. This may reduce the chance of overexposure and underexposure and improve the amount of detail captured in the image data. Furthermore, according to some aspects of the present disclosure, if some sub-portions of a camera's field of view require illumination at a high intensity, power consumption can be reduced by use of independent illumination of high intensity of only those sub-portions. Reduced power consumption and overall power usage may also extend battery life in implementations where the image capture device obtains power, at least in part, from a battery.

These and other aspects of the disclosure will now be described with regard to certain examples and embodiments, which are intended to illustrate but not limit the disclosure. Although the examples and embodiments described herein will focus on, for the purpose of illustration, specific calculations and algorithms, one of skill in the art will appreciate the examples are illustrative only and are not intended to be limiting.

FIG. 1 illustrates an example system 100 configured to dynamically adjust illumination in a camera's FOV 106 using an illumination controller 102 and an illumination device 104. Illumination controller 102 may be configured to obtain and process image data for a field of view (FOV) encompassing camera's FOV 106 and determine whether adjustments need to be made to illumination for camera's FOV 106. Adjustments may be made independently to individual sub-portions 120 of an FOV of a camera. For illustrative purposes, sub-portions 120 can correspond to two or more sub-divisions of the FOV. The sub-portions 120 may be illustrative of equal size or uniform dimensions, and may be associated with some form of geometric shape, such as rectangles, circles, semi-circles, etc. In accordance with one or more preferred implementations, one or more sub-portions may not be a geometric shape. The sub-portions 120 may include sub-portions having non-uniform shapes and dimensions (relative to the other sub-portions). The sub-portions may change shape. For example, in some embodiments, adjustments may be made to the shape of the sub-portions to adjust illumination (e.g., by receipt of instructions from the illumination controller). The number of sub-portions or configuration of the sub-portions implemented in accordance with the present disclosure is not limited to the illustrative examples.

Illumination device 104 may be configured to receive instructions from illumination controller 102 and implement adjustments to illumination for camera's FOV 106. For example, instructions may be received by a first processor in illumination device 104 from a second processor in illumination controller 102. Different illumination adjustments may be made to individual sub-portions 120 of the field of view of the camera. For example, as will be discussed in more detail below, the different illumination adjustments may be made to adjust lighting for different objects within camera's FOV 106. In some embodiments, one or more sub-portions 120 may be excluded from image adjustments. The exclusion determination may be made automatically, through use of user input, or some combination thereof. Additionally, or alternatively, in some embodiments, the same illumination adjustments may be made for all of sub-portions 120.

Light emitted to one or more sub-portions 120 may form an illumination pattern. For example, light emitted to at least two sub-portions 120 may form an illumination pattern. In some embodiments, sub-portions 120 may overlap. In some embodiments, illumination directed to at least two sub-portions 120 may overlap to form an illumination pattern. In other embodiments, there may be no overlap in different sub-portions 120. Additionally, or alternatively, illumination directed to at least two sub-portions 120 may not overlap.

In accordance with one or more preferred implementations, sub-portions for a field of view of a camera may be defined or specified with reference to pixel locations for image data generated by the camera.

In accordance with one or more preferred implementations, sub-portions for a field of view of a camera are specified by horizontal and/or vertical angular measurements, e.g., a camera with a 150-degree horizontal field of view may be defined to include three sub-portions, each encompassing a 50-degree horizontal sweep through the field of view.

Illumination controller 102 may obtain image data through use of an image capture device (e.g., a camera device). Additionally, or alternatively, the image capture device may utilize one or more image sensors to capture image data. Image sensors may include, but are not limited to, a complementary metal oxide semiconductor (CMOS) sensor, a charge coupled device, an active pixel sensor, another type of image capture device, or some combination thereof. In some embodiments, the image capture device may be internal to illumination controller 102. In other embodiments, the image capture device may be housed separately from illumination controller 102.

Illumination controller 102 may obtain image data of camera's FOV 106. Image data may be obtained from an image capture device. In some embodiments, image data may be captured during the day. In other embodiments, the image data may be captured at night. In further embodiments, the image capture may occur in the transition period between day and night (e.g., a detected sunset or defined sunset) or in the transition period between night and day (e.g., a detected sunrise or defined sunrise). Illumination controller 102 may determine adjustment to illumination based at least in part on the time of day.

In addition, image data may be obtained continuously. Additionally, or alternatively, image data may be obtained for a collection period. The collection period may be triggered by an event (e.g., detection of movement, start of a day, start of a night, etc.). Additionally, or alternatively, image data may be obtained at intervals. For example, image data may be obtained during collection periods that reoccur at set intervals of time.

In accordance with one or more preferred implementations, a camera device is configured to activate a camera and generate image data in the form of a snapshot at periodic intervals, e.g., once every ten minutes or once every hour.

In accordance with one or more preferred implementations, a camera device is configured to activate a camera and generate image data in the form of video in response to user input via an app loaded on a mobile device of a user, e.g., in response to a request to view a live video feed from the camera device.

In accordance with one or more preferred implementations, a camera device is configured to activate a camera and generate image data in the form of video in response to motion detected by a motion detector of the camera device, e.g., a passive infrared sensor.

A passive infrared sensor may comprise, for example, two pyroelectric sensing elements. Each pyroelectric sensing element comprises a pyroelectric crystal. Each pyroelectric sensing element generates an electrical charge in response to heat. Radiation (e.g., infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g., junction field effect transistors) or operational amplifiers are used to convert charge into a signal voltage.

A passive infrared sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

A passive infrared sensor may include two slots, each providing an optical path to one of the pyroelectric sensing elements. A device may comprise one or more lenses configured to direct light received at the one or more lenses onto one of the pyroelectric sensing elements. A device may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light. The pyroelectric elements may be positioned side by side and aligned along an axis (e.g., a horizontal axis or a vertical axis).

A passive infrared sensor may be analog, with an analog signal output, or may be digital, with digital data output generated utilizing an analog-to-digital converter (ADC).

An electronic device (such as a camera device) may include one or more passive infrared sensors that the electronic device uses to detect motion of objects. Each passive infrared sensor may output a signal or sensor data, where the electronic device uses a characteristic determined using the signal or sensor data to determine whether the passive infrared sensor detected an object. The characteristic may include a voltage represented by the signal or sensor data, an amplitude of a wave generated or determined using the signal or sensor data, an angle of the wave generated using the signal or sensor data, and/or the like.

For example, a first passive infrared sensor may have a first field of view (FOV) that extends a first distance from the electronic device. In some examples, the first FOV is created based on placing the first passive infrared sensor in a first direction and/or using one or more lenses (which may be a lens of the passive infrared sensor, or which may be a lens used in addition to or in replacement of a lens of the passive infrared sensor).

In accordance with one or more preferred implementations, a PIR sensor includes an integrated circuit (IC) component that receives voltage inputs from one or more lines coupled to a first PIR sensing element and a second PIR sensing element. In accordance with one or more preferred implementations, the IC component receives an input from each sensing element, while in accordance with one or more preferred implementations, the IC component receives a summed voltage.

In accordance with one or more preferred implementations, the IC component determines whether a summed voltage exceeds a first threshold, and, if so, sends a logic signal (e.g., a Boolean value or an interrupt) to a controller (e.g., a microcontroller unit or MCU) of an electronic device. Based on the received logic signal, the controller begins periodically polling or requesting PIR data (e.g., a most recent data value at the time of polling) from the IC component. For example, the controller may poll the IC component at a rate of 64 Hz. In accordance with one or more preferred implementations, the logic signal represents an interrupt that triggers additional processing.

In some example systems, if motion is detected in an environment monitored by a motion sensor such as a PIR sensor, the triggered motion sensor may send a signal to a controller of a camera device comprising the motion sensor. The signal may be effective to cause the camera device(s) to begin capturing image data and/or video data. For example, camera device comprising a PIR sensor may be situated in a particular room of a building. If the PIR sensor is triggered (e.g., due to a human walking through the room), the PIR sensor may send a signal to the controller of the camera device indicating that motion has been detected by the PIR sensor. In response to receipt of the signal from the PIR sensor, the camera device may be configured to begin capturing video.

Illumination controller 102 may also utilize image data as feedback. For example, illumination controller 102 may determine to make a first adjustment based on received image data during a first collection period. Subsequently, image data may be obtained for a second collection period. The image data from the second collection period may be compared to the image data from the first collection period to determine whether additional adjustments need to be made. Data collected over more than one collection period may be compared to determine whether an adjustment needs to be made.

Additionally, or alternatively, illumination controller 102 may determine to adjust illumination for a camera's FOV 106 after comparison of sub-portions 120 of a captured image to one or more thresholds (e.g. based on stored sub-portion data for captured images or based on stored sub-portion data for a field of view of a camera or based on correspondence to a sub-portion of a field of view of a camera for which data is stored). An entire image may also be compared against the one or more thresholds. The one or more thresholds may be illumination thresholds or time-based thresholds. Illumination thresholds may include brightness thresholds and dimness thresholds. A brightness threshold may be exceeded if the sub-portion(s) 120 being considered is or are determined to be overexposed. A dimness threshold may be exceeded if sub-portion(s) 120 being considered is or are determined to be underexposed. An illumination threshold may be an absolute threshold. Additionally, or alternatively, an illumination threshold may be a normalized threshold. In some embodiments, an illumination threshold may be set by illumination controller 102 based on an average illumination intensity. Average illumination intensity may be calculated from illumination data collected for one or more collection periods. Additionally, in other embodiments, an illumination threshold may be set by illumination controller 102 based on a normalized illumination intensity.

Time-based thresholds may be exceeded if an illumination threshold has been exceeded for a preset period of time. For example, in a non-limiting embodiment, if a first illumination threshold is exceeded for a first preset period of time, a first time-based threshold may be exceeded. Time-based thresholds may be specified by a user. Additionally, or alternatively, time-based thresholds may be specified by a system administrator. Of course, other parties may also specify the time-based thresholds. Specifying a time-based threshold may include specifying the preset period of time for which an absolute illumination threshold associated with the time-based threshold may be exceeded.

A camera's FOV 106 may contain objects that have different properties. These properties may be relevant in determining whether an object meets or exceeds a threshold. Properties of an object may include, but are not limited to, proximity to illumination controller 102, distance from illumination controller 102, whether the object is static (not in motion), whether the object is dynamic (in motion), and the sub-portion 120 in which the object is located. Furthermore, an object's properties may change over time. For example, a camera's FOV 106 may contain the objects: wall 108, doorbell 110, sign 112, person 114, dog 116, and plant 118. Objects wall 108, doorbell 110, sign 112, and person 114 may be considered to have the properties of being close and static. However, one or more objects that are considered close and static may move further away, thereby changing their properties from close to far and from static to dynamic.

For example, in one non-limiting embodiment, person 114 may have the properties of close and static. Person 114 may move further away. The movement may reflect a decision by the person to approach another object (e.g., dog 116). During the movement period, the properties of the object may change (e.g., from static to dynamic). Object properties may change again (e.g., from dynamic to static, from close to far, etc.) when person 114 reaches a destination. In another non-limiting embodiment, dog 116 may initially have the properties of far and dynamic and represent an animal. Plant 118 may be an object that is typically static, but may become dynamic (e.g., if dog 116 contacts plant 118).

Changes in properties (e.g., whether one or more objects have a dynamic property) may be used to determine whether to adjust illumination. For example, in a non-limiting embodiment, illumination controller 102 may determine to make an adjustment to the illumination but wait to implement the adjustment until no objects in the image capture area have a dynamic property. In some embodiments, sensors (e.g., motion sensors, image sensors, etc.) may be used to detect objects, object properties, and/or changes in object properties. For example, illumination controller 102 may be configured to receive input from sensor and determine objects and object properties based at least in part on this input. Additionally, or alternatively, in some embodiments, machine learning models may be employed to detect objects, object properties, and/or changes in object properties.

After making a determination to adjust illumination, illumination controller 102 may transmit instructions to adjust illumination to illumination device 104. Illumination device 104 may be configured to receive instructions from illumination controller 102 and implement the instructions to adjust illumination. For example, illumination device 104 may include a controller to control one or more illumination units, e.g., light emitting diodes (LEDs). The illumination units may be configured for individual control. The controller may be configured to receive control instructions corresponding to individual control of each illumination unit. For example, each illumination unit may be assigned an individual driver channel.

Additionally, or alternatively, illumination units may also be controlled in groups (e.g., two LEDs may be associated with a single channel). Instructions to illumination device 104 may include instructions to adjust illumination for one or more sub-portions 120 (e.g., one or more sub-portions associated with a channel or LED). For example, each illumination unit may be associated with a particular sub-portion 120. An independent driver channel may be used to control all illumination units associated with a particular sub-portion 120.

As described above, in some embodiments, the one or more illumination units of illumination device 104 may include LEDs. The LEDs may be arranged in various configurations, such as in different matrix arrangements or individually disposed on a substrate. Additionally, or alternatively, the illumination device 104 may also include other types of illumination units (e.g., incandescent bulbs, halogen bulbs, another type of illumination unit, or some combination thereof). Illumination device 104 may also include optical elements to facilitate directing light. The optical elements may include, but are not limited to lenses, reflective structures, and diffusive coatings. The illumination device 104 may emit light having a wavelength or frequency in the IR spectrum. Of course, emission of light at other wavelengths and frequencies are also possible (e.g., in the UV spectrum, in the visible spectrum, or some combination thereof.)

Figure 2:
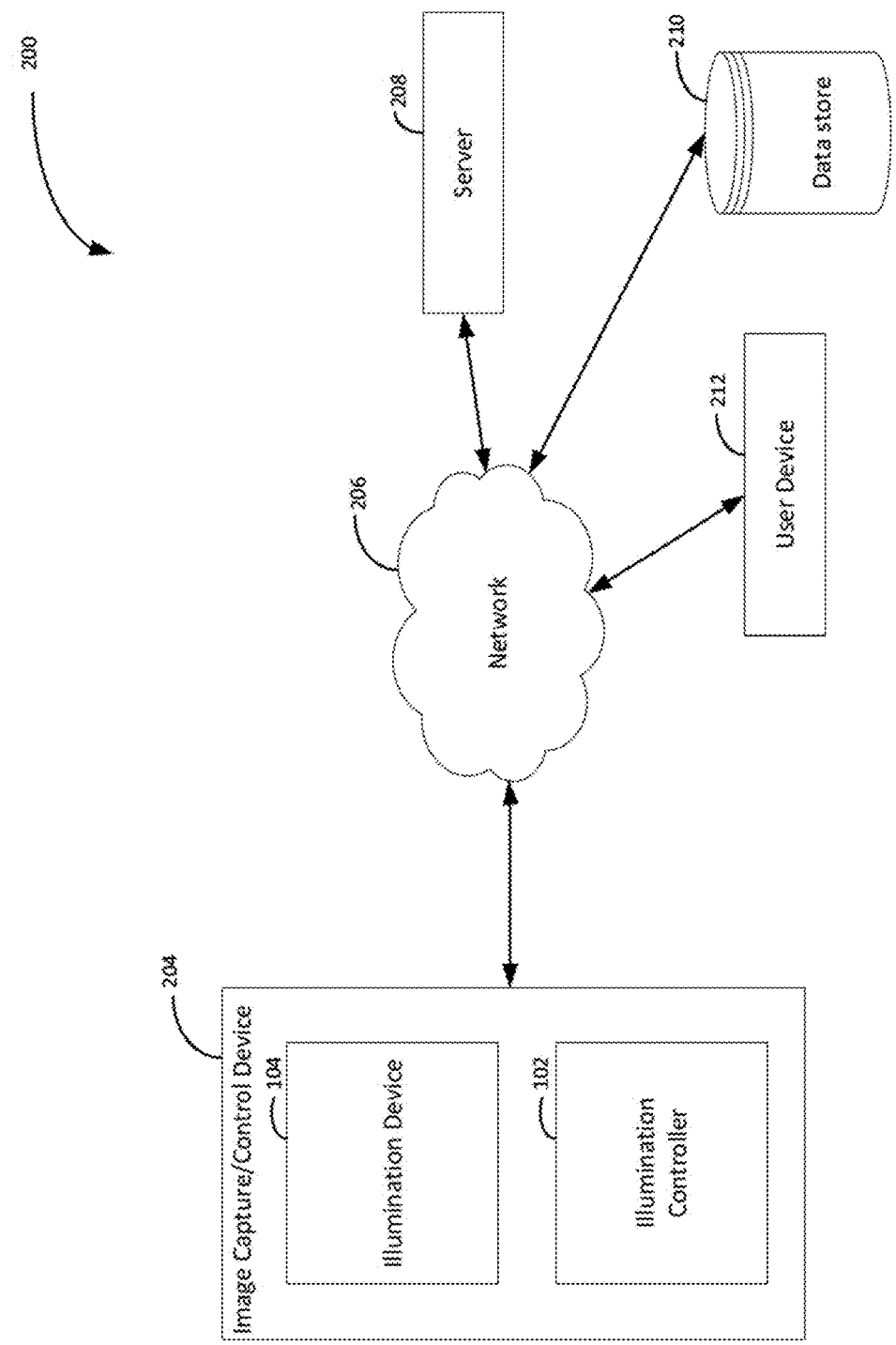
FIG. 2 illustrates example interactions between components of an example system to dynamically adjust lighting in an image capture area.

FIG. 2 illustrates example interactions between components of an example system to dynamically adjust lighting in an image capture area (e.g., a camera's FOV 106 of FIG. 1). As illustrated in FIG. 2, the illumination device 104 and the illumination controller 102 may serve as components to form part of an image capture and control device 204. Image capture and control device 204 may be used to adjust illumination in an image capture area (e.g., a camera's FOV 106 of FIG. 1). For example, in a non-limiting embodiment, an illumination controller component (e.g., illumination controller 102 of FIG. 1) of image capture and control device 204 may provide instructions for a controllable illumination component (e.g., illumination device 104 of FIG. 1) of image capture and control device 204 to generate illumination for individual sub-portions of the camera's FOV.

Image capture and control device 204 may communicate with a network 206. Network 206 may additionally be in communication with server 208, data store 210, and user device 212. Network 206 may be configured to facilitate communication between image capture and control device 204, server 208, data store 210, and user device 212.

For example, network 206 may receive instructions from user device 212 for image capture and control device 204. Additionally, or alternatively, communication with network 206 may include receipt of instructions from server 208. Image capture and control device 204 may also transmit data through network 206 to another device (e.g., data store 210 or user device 212).

User device 212 may be a mobile device associated with a user (e.g., a cellphone, a smart watch, another wearable device, etc.). In some embodiments, user device 212 may require authentication credentials to transmit and receive data originating from image capture and control device 204. In further embodiments, more than one user device may have authentication credentials to transmit and receive data originating from image capture and control device 204.

Figure 3:
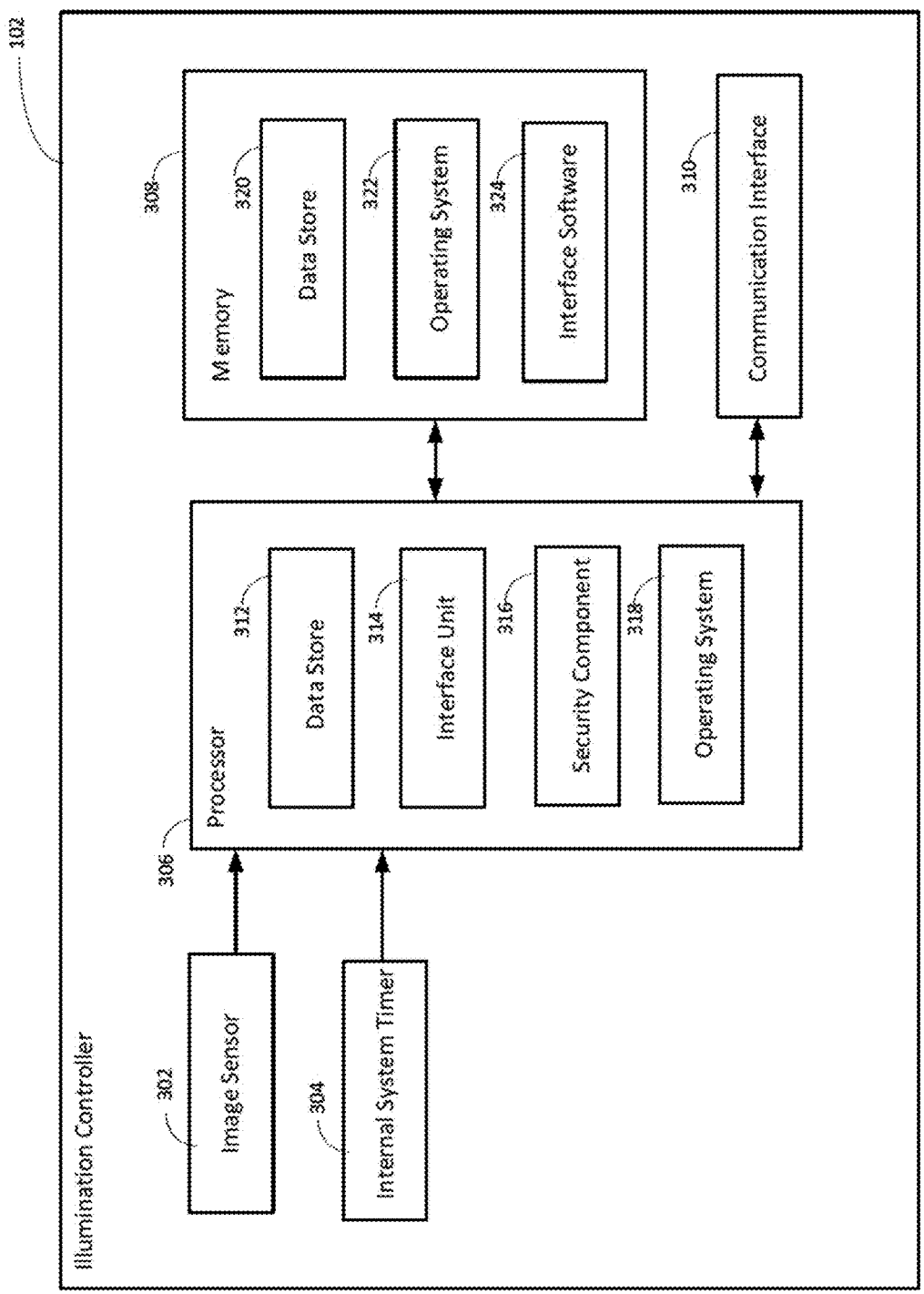
FIG. 3 schematically illustrates an illumination controller.

FIG. 3 schematically illustrates illumination controller 102. Illumination controller 102 may include image capture device 302, internal system timer 304, processor 306, and memory 308. As will be described in more detail below, each of these components may include additional sub-components. Regarding image capture device 302, image capture device 302 may be internal to illumination controller 102. In other embodiments, image capture device 302 may be external to illumination controller 102. In further embodiments, image capture device 302 may communication with illumination controller 102 through a network (e.g., network 206).

Illumination controller 102 may further include internal system timer 304. Internal system timer 304 may keep track of a clock time (e.g., a time relative to a particular time zone), or may count seconds or other units of time that have passed since an event (e.g., a trigger used to begin or end data collection). For example, processor 306 may trigger internal system timer 304 to start or stop depending based on an event (e.g., motion detection, start of a day, start of a night, etc.).

Internal system timer 304 may be used to determine when to obtain image data. For example, processor 306 may utilize timing information from internal system timer 304 to instruct image capture device 302 to collect image data for a collection period (e.g., 1 second) using the image capture device. In some embodiments, processor 306 can further use timing information from internal system timer 304 to generate instructions to image capture device 302 to collect image data for a collection period, wait for a set interval of time (e.g., 5 seconds) and collect image data for another collection period (e.g., 1 second). One skilled in the relevant art will appreciate that the disclosed time intervals are illustrative in nature and that additional or alternative time intervals may also be applicable.

Processor 306 may include data store 312, interface unit 314, security component 316, and operating system 316. Data store 312 may be configured to store data for a certain number of collection periods. Data store 312 may also contain instructions to apply to convert incoming image data, as will be discussed in more detail below. The amount of data to be stored in data store 312 may be set by the manufacturer. Additionally, or alternatively, a user or an administrator may limit the amount of data to be stored in data store 312. Data store 312 may be a temporary data store (e.g., RAM). Processor 306 may send data in data store 312 to memory 308 for further storage. Interface unit 314 may provide connectivity to one or more devices or components. For example, in some embodiments interface unit 314 may provide connectivity between illumination controller 102 and illumination device 104. Additionally, or alternatively, interface unit 314 may provide connectivity to other devices through network 206 of FIG. 2.

Security component 316 may facilitate secure communications with other devices. For example, in a non-limiting embodiment, security component 316 may facilitate the validation and processing of security credentials for one or more user devices (e.g., user device 212). In some embodiments, this communication to other devices may occur through a network (e.g., network 206). In other embodiments, security component 316 may not be present. Processor 306 may include an operating system 318 that provides computer program instructions for use in the general administration and operation of illumination controller 102.

Memory 308 may include computer program instructions that are executed by processor 306 in order to implement one or more embodiments. Memory 308 generally includes RAM, ROM or other persistent or non-transitory memory. These may be included as data store 320. Memory 308 may include an operating system 322 that provides computer program instructions for use by processor 306 in the general administration and operation of illumination controller 102. Memory 308 may further include computer program instructions and other information for implementing aspects of the present disclosure. For example, in one embodiment, memory 308 includes instructions regarding the amount of storage to be used over a period of time. In some embodiments, the memory 308 may include a storage for Interface Software 324. This may include information necessary for communication with one or more network devices by the communication interface communication interface 310. Communication interface 310 may be a separate component to provide connectivity to one or more networks or computing systems, such as the illumination device 104, server 208, data store 210, or user device 212 of FIGS. 1-2.

Example Methods for Implementing Adaptive Illumination

Figure 4:
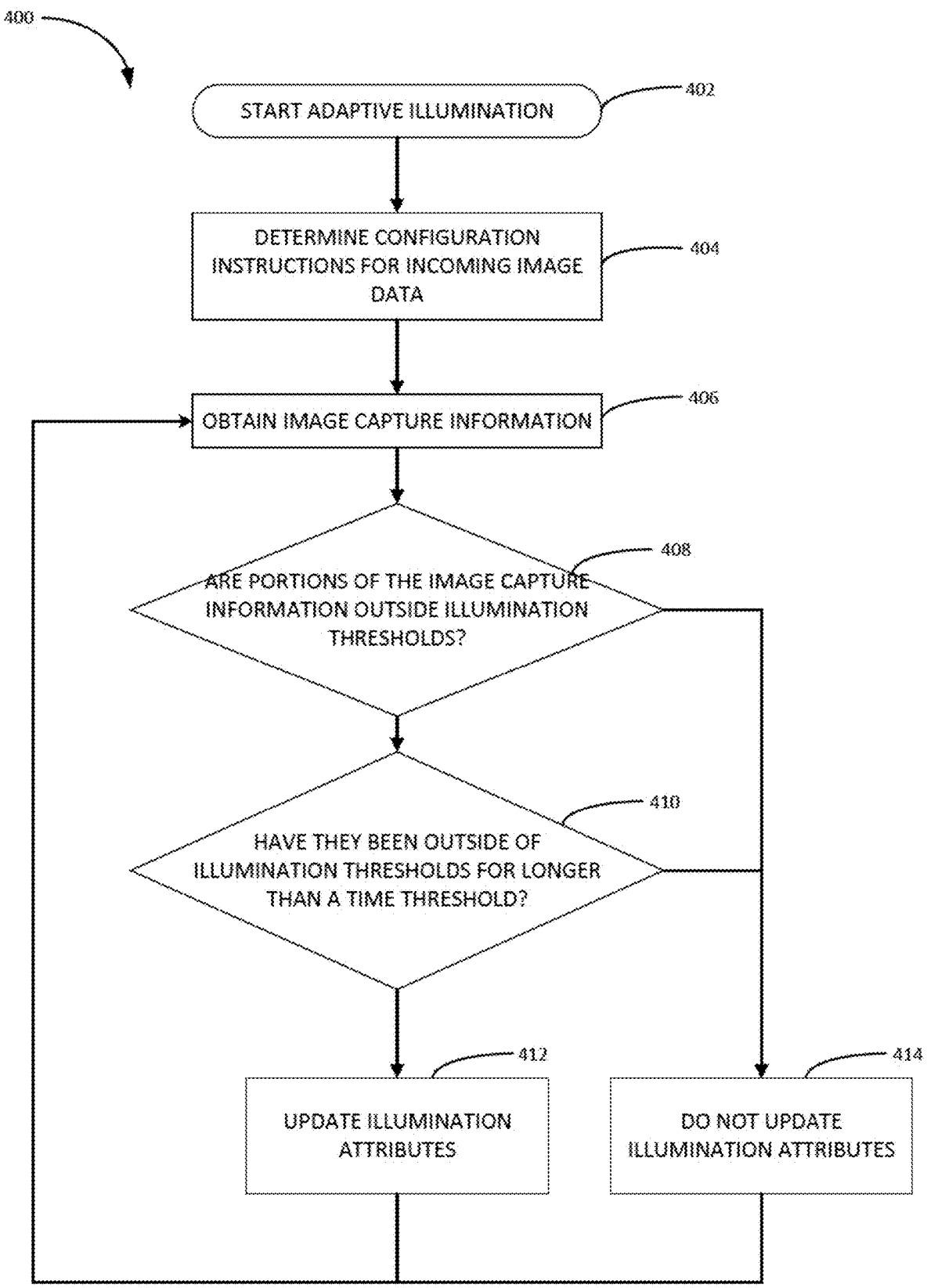
FIG. 4 illustrates an example method for adjusting illumination for an image capture area.
Figure 5:
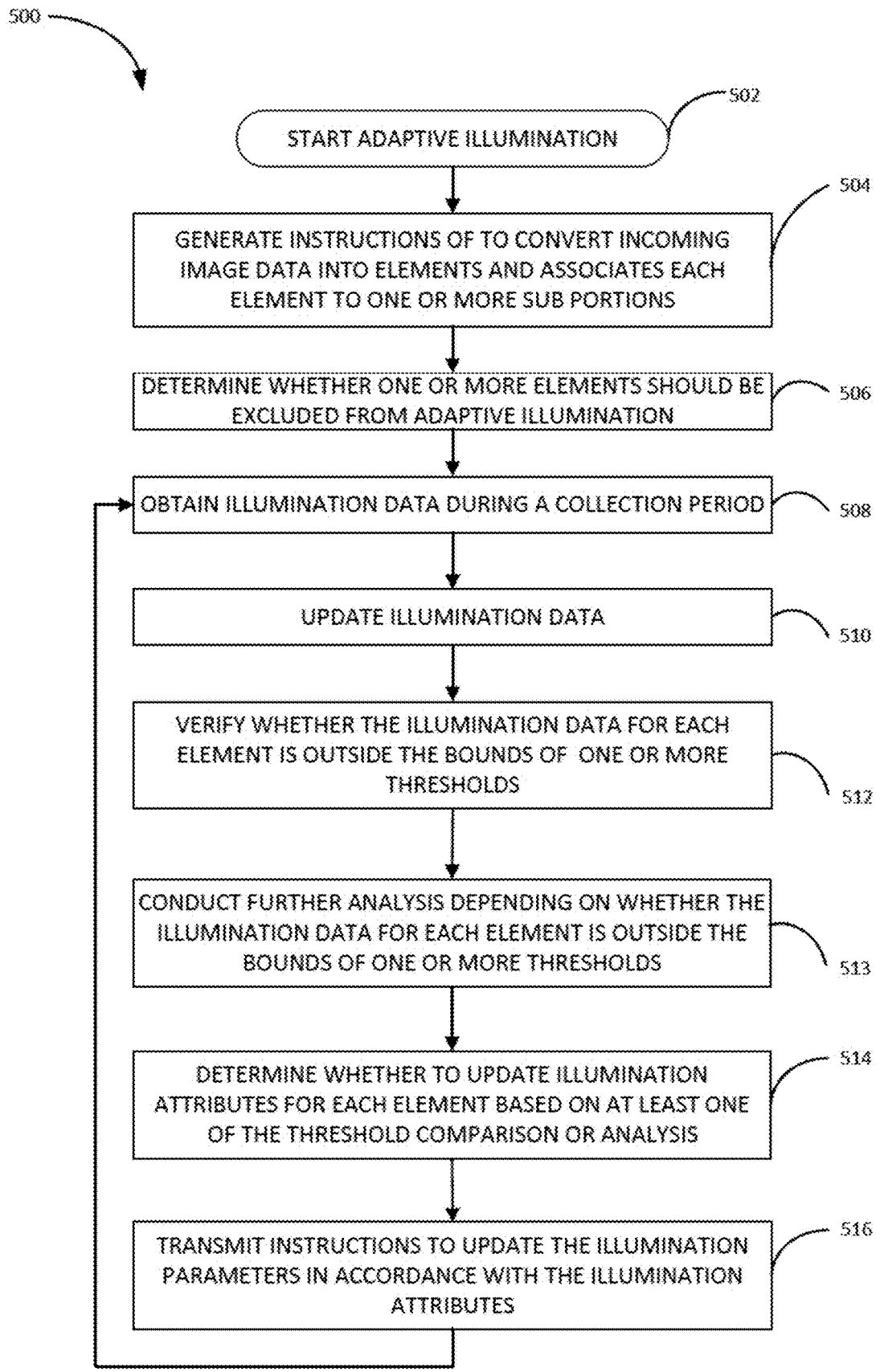
FIG. 5 illustrates another example method for adjusting illumination for an image capture area.

FIG. 4 illustrates and example method 400 for adaptive illumination. FIG. 5 illustrates another example method 500 for adaptive illumination. FIGS. 4 and 5 will be discussed in parallel to show similarities and differences between the example methods.

Example method 400 starts at block 402. Example method 500 starts at block 502. At block 404, configuration instructions are determined for incoming data. Determining configuration instructions can be performed by a processor (e.g., processor 306 of FIG. 3) Generating configuration instructions for incoming data may include generating instructions to extract illumination data from image capture information obtained from one or more image capture devices.

Additionally, or alternatively, such as at block 504, generating configuration instructions may include dividing the image data into elements and associate each element of the image data with at least one or more sub-portions of an FOV of the camera (e.g., sub-portions 120 of FIG. 1). Sub-portions may be representative of parts of an image capture area (e.g., a camera's FOV 106) captured an image capture device. Additionally, or alternatively, sub-portions may be areas which can be illuminated independently by a controllable illumination component (e.g., illumination device 104 of FIGS. 1-2). As will be discussed in more detail below, changing the adjustable illumination attribute may result in illumination provided by the controllable illumination component (e.g., illumination device 104 of FIGS. 1-2).

Figure 12:
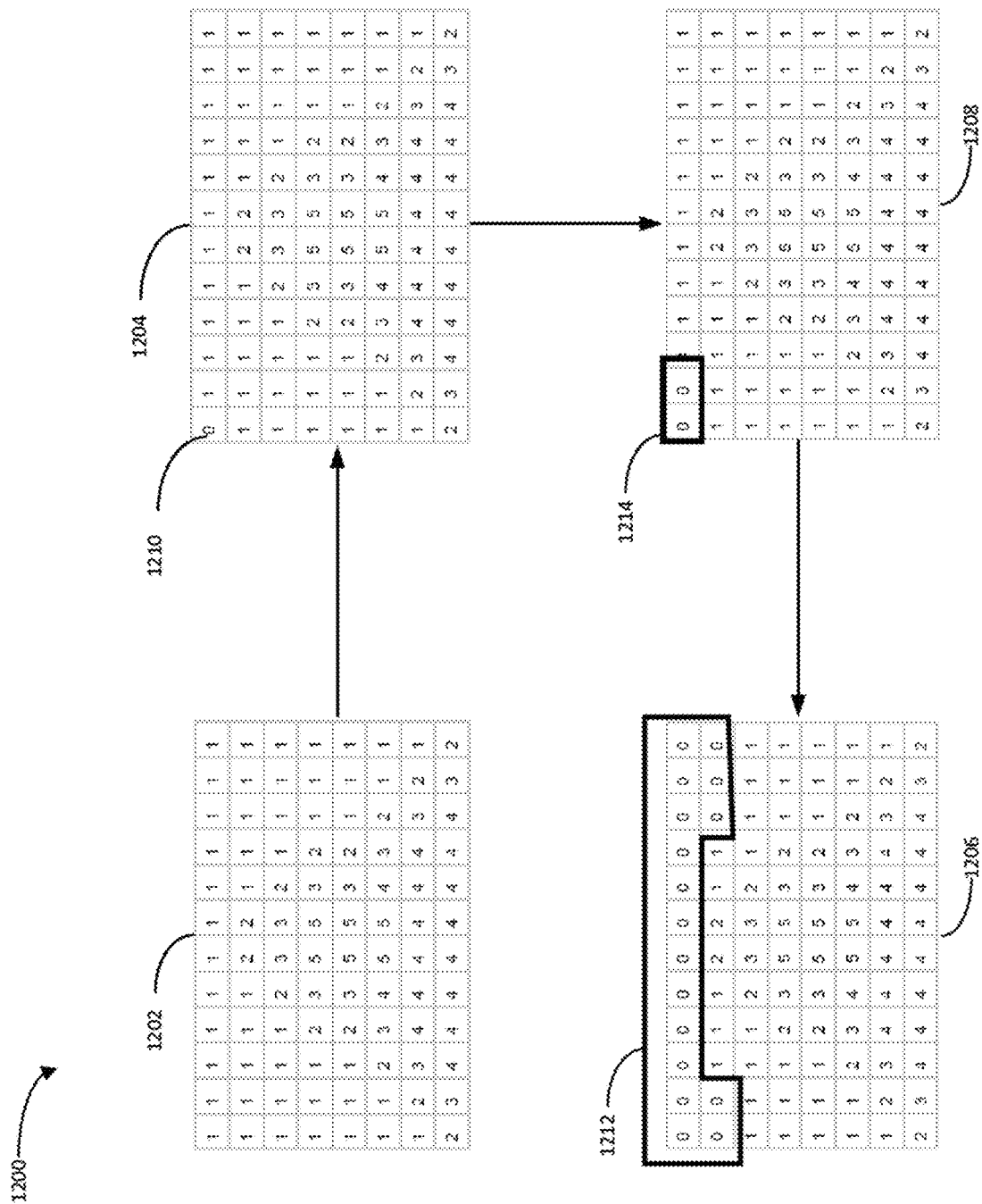
FIG. 12 illustrates an example of exclusion of elements from illumination adjustments, according to some embodiments.

In some embodiments, generating configuration instructions may further include determining a reference element for captured image data. For example, as illustrated by FIG. 12, at step 1202, initial configuration data may be collected. That data may be stored in a grid. Each element of the grid may correspond to an area of a field of view or image capture area. Subsequently, at block 1204, a reference element 1210 may be configured. Determination of the reference element 1210 may be made by an illumination controller (e.g., illumination controller 102 of FIG. 1). The determination may be made by using one or more thresholds. Additionally, or alternatively, reference element 1210 may be configured based on where the element falls within the grid (e.g., the top left corner). Additionally, or alternatively, reference element 1210 may be used to set an illumination threshold.

In some embodiments, the illumination threshold may be a brightness threshold. In other embodiments, the illumination threshold may be a dimness threshold. Illustratively, the illumination threshold can correspond to absolute threshold in which exceeding the threshold can result in a characterization of over-illumination. Referring to FIG. 5 at block 506, each element of the image data may be compared to this illumination threshold. If the illumination threshold is exceeded for time-based threshold, that element may be excluded from further adjustments to illumination. This may occur if an element is located in an area of the image where a reflective object is present (e.g., a wall). Additionally, or alternatively, a user may exclude elements from further adjustments. For example, in a non-limiting embodiment, a user may determine during that part of the image capture area contains information that is not of interest to them. The user may then provide instructions to exclude this area. This instruction may be provided to an illumination controller (e.g., illumination controller 102 of FIG. 1-3). Additionally, or alternatively, this instruction may be provided to an external device in communication with the illumination controller and/or the controllable illumination component.

In some embodiments, elements within the grid are set to zero when excluded from illumination adjustments. For example, at step 1208, elements 1214 are set to zero and, at step 1206, elements 1212 are set to zero. Exclusion from illumination adjustments may involve generation of instructions to not illuminate the sub-portions 120 associated with the excluded elements Additionally, or alternatively, exclusion from illumination adjustments may involve generation of instructions to illuminate sub-portions 120 associated with the excluded elements to a set level of illumination (e.g., a low level of illumination). Instructions may be generated by the illumination controller. Additionally, or alternatively, instructions may be generated by user input. Of course, a combination of sources for instructions is also possible. For example, in a non-limiting embodiment, instructions may be generated by the illumination controller to adjust illumination in a sub-portion. A user may later decide to exclude that sub-portion from illumination adjustments, provide corresponding instructions. (e.g., to the illumination controller, to a device in communication with the illumination controller, to the illumination device, etc.)

At block 406, additional image capture information may be obtained. Image capture information may be obtained continuously. Image capture information may include illumination data. Illumination data may include information relating to illumination levels of each sub-portion of an FOV of a camera. Referring to FIG. 5 at block 508, illumination data may also be obtained during one or more collection periods. Illumination data from past collection periods may be stored, such as in memory 308. Illumination data may be updated with recently obtained data, such as at block 510.

There may be intervals of time between the collection periods. Illumination may be updated during these intervals.

Illumination may be on a scaled manner during these intervals. For example, in one non-limiting embodiment, it may be determined that a sub-portion at a high illumination level should be adjusted to a low illumination level. The illumination may be adjusted first to one or more medium levels before moving to a low level of illumination.

At block 408, the image capture information may be compared to one or more illumination thresholds. In some embodiments, illumination data may be extracted from image capture data and compared to one or more illumination thresholds. Referring to FIG. 5 at block 512, comparing illumination data to one or more thresholds may include verifying whether the illumination data for each element is outside the bounds of one or more thresholds. As discussed above, these thresholds could be at least brightness thresholds or dimness thresholds. Of course, other types of thresholds related to illumination may also be used. A brightness threshold may be exceeded if the element being compared is too bright. A dimness threshold may be exceeded if the element is too dim.

At block 410, the image capture information may be compared against one or more time-based thresholds. In some embodiments, illumination data may be extracted from image capture data and compared to one or more time-based thresholds. Each time-based threshold may be associated with an illumination threshold. For example, a time-based threshold may be exceeded if an illumination threshold has been exceeded for more than a set length of time. The set length of time may be longer than a collection period. Image capture information from past collection periods may be used to determine whether a time-based threshold has been exceeded.

Additional analysis may occur after a threshold has been exceeded. Additionally, or alternatively, additional analysis may occur if a group of thresholds are exceeded. Referring to FIG. 5 at block 513, further analysis may be conducted based on whether one or more thresholds are exceeded. For example, in a non-limiting embodiment, if an illumination threshold for an element is exceeded and a corresponding time-based threshold is exceeded, additional analysis may be conducted. However, in some embodiments, the additional analysis may be triggered by exceeding only one threshold, more than two thresholds, a set number of thresholds for more than one element (e.g., in one or more sub-portions), another arrangement of thresholds, or some combination thereof. Additionally, or alternatively, if illumination thresholds and/or time-based thresholds are exceeded for a group of elements (e.g., elements associated with the same sub-portion) additional analysis may be conducted. The additional analysis may relate to how to adjust the illumination attributes. For example, additional calculation may be performed to determine how to adjust the illumination attributes based at least in part on the degree to which a threshold (e.g., an illumination threshold, a time-based threshold, another threshold, some combination thereof) was exceeded.

Referring back to FIG. 4 at block 412, a determination may be made to update illumination attributes. Illumination attributes may be updated for at least two sub portions. Of course, in some embodiments, only one sub portion may be updated. At block 414, a determination may be made to forego updating illumination attributes. The determination on whether to update attributes may be made by the illumination controller. The determination may be based at least in part on comparison to the one or more thresholds. For example, referring to FIG. 5 at block 514 a determination is made on whether to update illumination attributes. This decision may be based at least in part on comparison to one or more thresholds. Additionally, or alternatively, the decision may be based at least in part on further analysis conducted after the comparison to one or more thresholds. In some embodiments, the decision on whether to conduct additional analysis may be based on the comparison to the one or more thresholds.

Updating illumination attributes may include generating instructions for an illumination device to update illumination in accordance with the determination. For example, referring to FIG. 5 at block 516 instructions may be transmitted to update the illumination parameters in accordance with the illumination attributes.

Figure 6B:
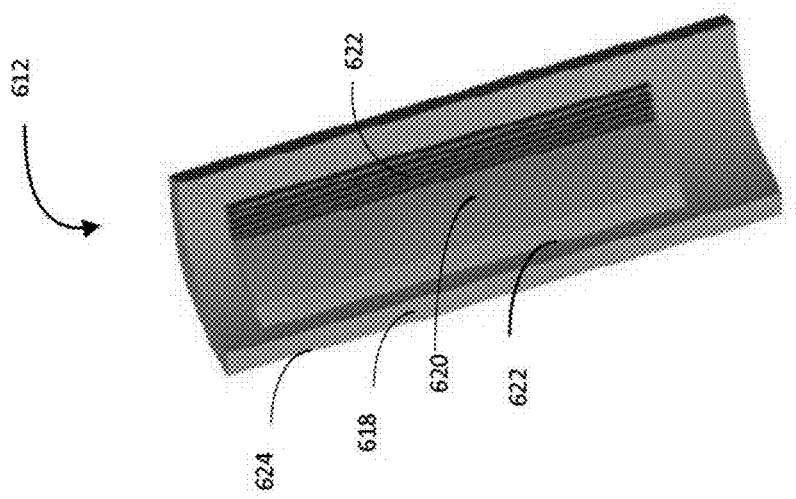
FIG. 6A-D illustrate example embodiments of an illumination device using illumination units on angled substrates.
Figure 6A:
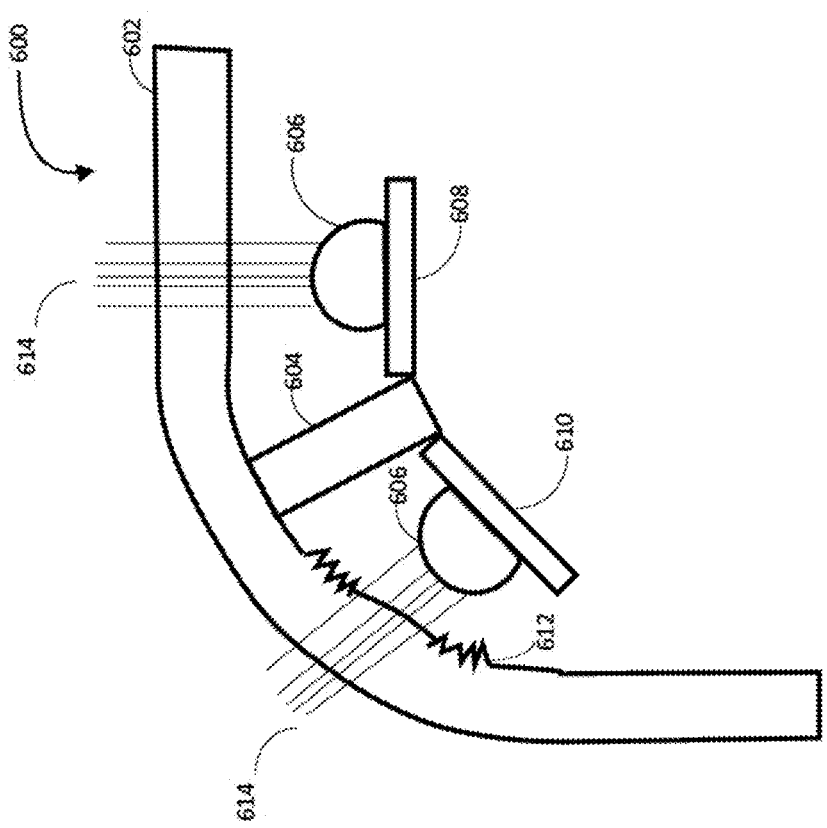

After block 412 or block 414, illumination data from the collection period may be transmitted to a memory (e.g., memory 308 of FIG. 3). Additionally, or alternatively, the method 400 may include returning to block 406 to obtain configuration data and repeating blocks 406-410. A different determination, for example, proceeding to block 414 instead of block 412 may be performed on each iteration of the loop. The loop from blocks 406-410, subsequently including either block 412 or 414, may occur during a collection period. In some embodiments, there may be an interval prior to restarting the loop to allow for scaled adjustment of illumination. Example Hardware Configurations for Adaptive Illumination FIGS. 6A-D illustrate example embodiments of an illumination device (e.g., illumination device 104 of FIGS. 1-2) using illumination units on angled substrates. Specifically, FIG. 6A illustrates an assembly 600 of the illumination device. The assembly 600 includes cover 602, support 604, illumination units 606, substrate 608, substrate 610, and optical element 612. FIG. 6A further illustrates light emitted from the assembly in paths 614. FIG. 6B illustrates optical element 612 including inner surface 618, rounded structure 620, ridged structure 622, and outer surface 624.

Cover 602 may include one or more optical elements, such as optical element 612. Components of optical element 612 may also be considered to be optical elements, in accordance with some embodiments. Cover 602 may include inner surface 618 and outer surface 624. The outer surface may be outer surface 624. The outer surface may be smooth. Additionally, or alternatively the outer surface may have a curved profile. Optical element 612 may be disposed on the inner surface 618.

The inner surface may additionally connect to one or more supports (e.g., support 604). These supports may additionally connect to substrates, such as substrate 608, and substrate 610. Substrate 608 and substrate 610 may be disposed at an angle in relation to optical element 612.

These substrates may be PCBs (e.g., flex PCBs, rigid PCBs, through-hole PCBs, etc.). Each substrate may connect to one or more illumination units 606 such that the orientation of at least some illumination units 606 align with the substrate. Each substrate may connect to one or more illumination units 606 such that the orientation of at least some illumination units 606 do not align with the substrate. The substrates may be coupled to a power source (e.g., a battery) to provide power to the one or more illumination units 606. The illumination units may be LEDs (e.g., IR LEDs, WLEDs, another type of LED, or some combination thereof). Of course, other types of illumination units are possible (e.g., incandescent bulbs, halogen bulbs, other illumination devices, or some combination thereof). Illumination units 606 may emit light in alignment with the body of the unit. Additionally, or alternatively, illumination units 606 may emit light at an angle to the body of the unit.

Substrates may be angled in relation to each other. For example, some substrates, such as substrate 608 may be straight (e.g., angled at 0 degrees). Some substrates, such as substrate 608 may be angled in relation to these straight substrates. In some embodiments, this angle may be −50 degrees. In other embodiments, this angle may be 50 degrees. Of course, other angles are also possible (e.g., −180 degrees, −120 degrees, −90 degrees, −45 degrees, 45 degrees, 90 degrees, 120 degrees, 180 degrees etc.). Each illumination unit 606 may align with the angle of the substrate to which it is connected. The angles may be selected to direct light in accordance with the angle to generate a desired field of illumination (e.g., 140×90 degrees, 150×150 degrees, 180-degree image circle, etc.).

Figure 6C:
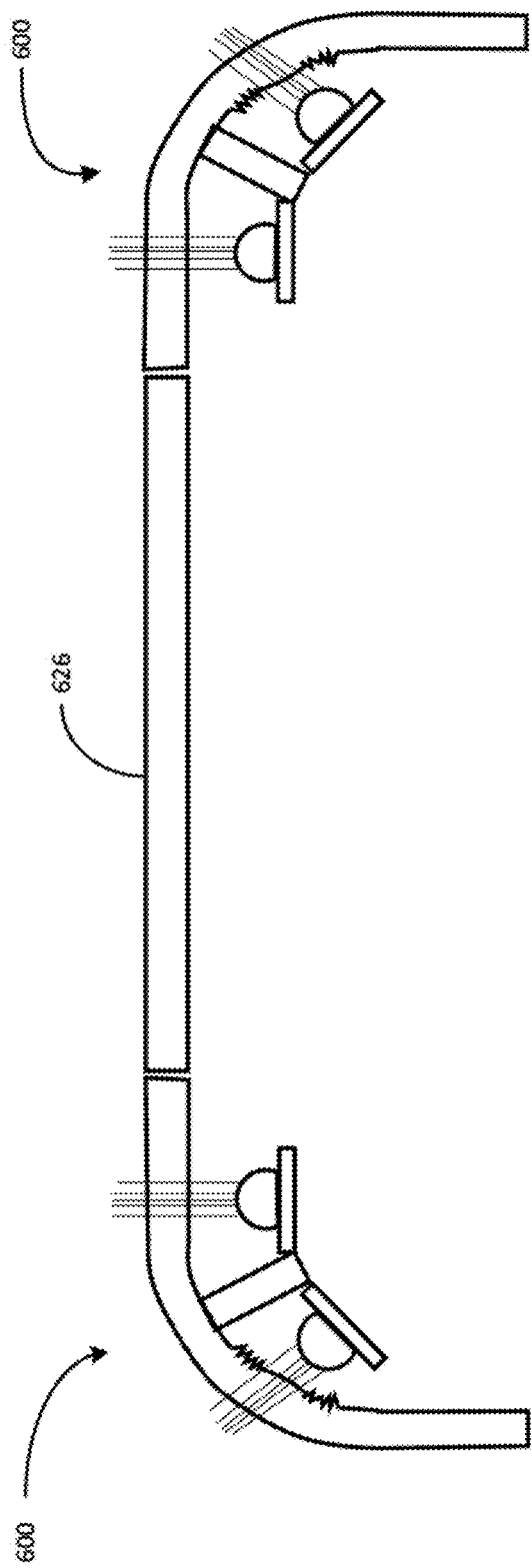

In one non-limiting embodiment, illustrated in FIG. 6C, four substrates with connected illumination units (e.g., illumination units 606 from FIGS. 6A-B) may be used. These substrates with may be used in conjunction with an extended cover 626. This extended cover may include two corners, with each corner comprising an assembly 600. In between the corners, extended cover 602 may extend in a flat plane. The flat plane may align with an image capture device. In one corner, the two substrates of the assembly 600 (e.g., substrates 608 and 610 may be angled-50 degrees and straight (e.g., angled at 0 degrees). In the second corner, the two substrates of the assembly 600 (e.g., substrates 608 and 610 may be straight (e.g., angled at 0 degrees) and angled 50 degrees. The field of view of this assembly may be 150×90 degrees. The assembly may allow for directing light generally to four sub-portions, wherein the sub-portions may represent separately controllable areas for illumination (although it will be appreciated that when light is generally directed towards one sub-portion some of it may partially illuminate another sub-portion). In accordance with one or more preferred implementations, each sub-portion is associated with a control channel. For example, the ability to control four sub-portions may allow coverage of four zones in a horizontal direction, or three zones in a horizontal direction and one zone vertically above or below the three zones.

Additionally, or alternatively, the assembly may allow for directing light to a different number of sub-portions than the number of illumination units present in the assembly. For example, with reference to the embodiment illustrated in FIG. 6C, one illumination unit 606 may be used to control a left sub-portion, two illumination units 606 may be used to control a central sub-portion, and one illumination unit may be used to control a right sub-portion.

The optical element 612 may serve to facilitate transmitting and redirecting light emitted from the illumination devices to generate illumination in each of one or more sub-portions. In some embodiments, substrate 608 or substrate 610 may be disposed at an angle in relation to optical element 612. In further embodiments, only one of substrates 608 and 610 may be disposed at an angle in relation to optical element 612.

In some embodiments, illumination may be generated based on instructions from an illumination controller (e.g., illumination controller 102). Optical element 612 may be manufactured using optical quality plastic material. In some non-limiting embodiments this material may be polycarbonate with a natural density (Nd) of 1.5855, and dispersion (Vd) of 29.909. In some embodiments, optical element 612 may be manufactured using a molding process. The finishing on the inner surface 618 and outer surface 624 may be allowed to have some non-uniformity with residual scattering. This non-uniformity may facilitate diffusing and smoothing the illumination pattern generated by the illumination device.

In some embodiments, the design of optical element 612 may use a prism array. The prism array may be a Fresnel type prism array. The structures forming the prism array may be rounded structure 620 and ridged structures 622. Rounded structure 620 may be aligned with an illumination unit 606 such that light is directed through it using path 614. Rounded structure 620 may have a curved profile where it aligns with an illumination unit 606. However, in some embodiments rounded structure 620 may not have a curved profile where it aligns with illumination unit 606.

Rounded structure 620 may have a rectangular footprint with two elongated sides. There may be one ridged structure 622 adjoining each elongated side of rounded structure 620. Ridged structure 622 may facilitate directing light from illumination unit 606 to optical paths 614. Ridged structure 622 may include one or more edges. In some embodiments the dimensions of the edges may be in the less than 0.025-0.05 mm.

Figure 6D:
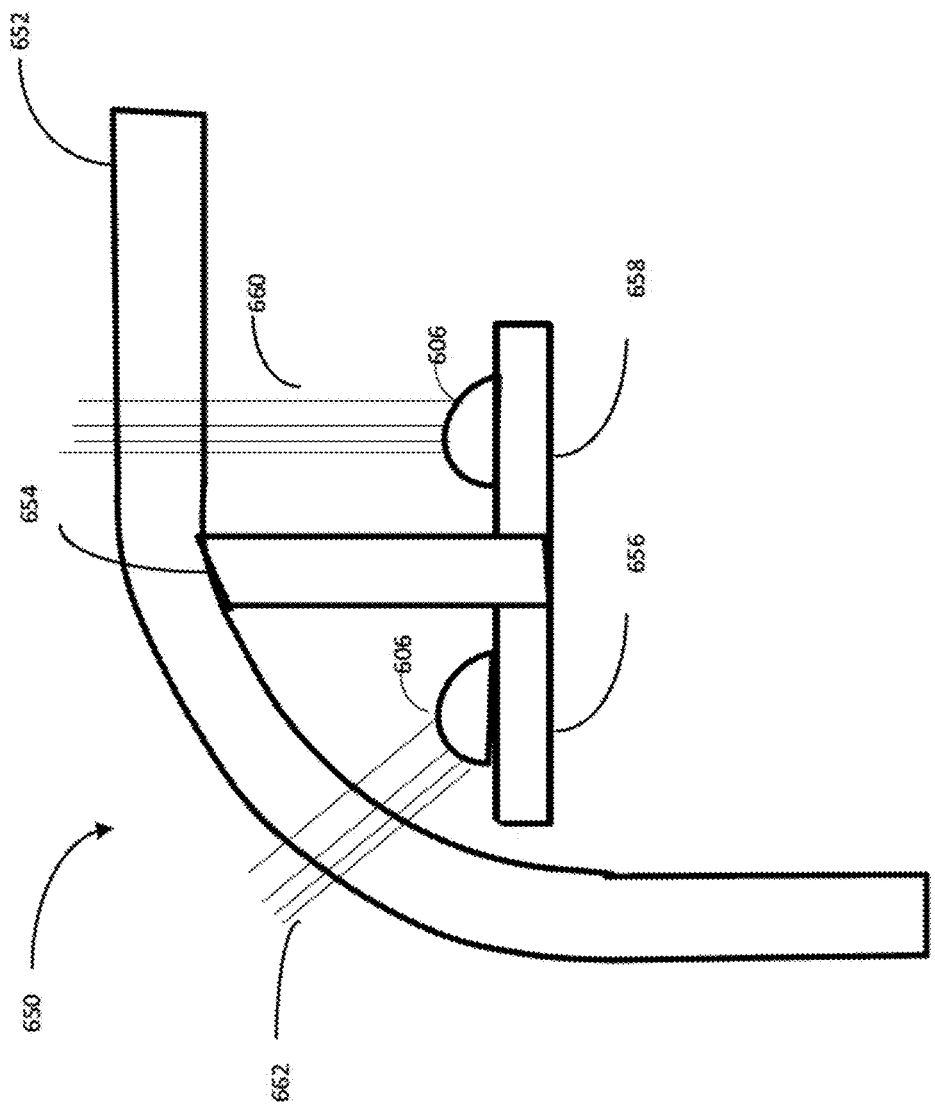

In some embodiments, an optical element may not be used to control the direction of light emitted from the illumination units 606. For example, one or more illumination units 606 may be configured to emit light at an angle (e.g., 30 degrees, 60 degrees, etc.) relative to the body of the illumination unit 606. FIG. 6D, for example, depicts an assembly 650 including a cover 652, a support 654, a substrate 656, and a substrate 658, and illumination units 606. In some embodiments substrate 656 and substrate 658 may be one substrate. One illumination unit 606 may be connected to substrate 656 such the orientation of the illumination unit 606 essentially align with the substrate. Similarly, one illumination unit 606 may be connected to substrate 658 such the orientation of the illumination unit 606 essentially align with the substrate. Each of substrates 656 and 658 may be connected to support 654 which connects to cover 652. Cover 652 may comprise a curved portion. In some embodiments, this curved portion may comprise additional structures to reduce noise in light emitted from illumination units 606. Of course, these additional structures may not be present in all embodiments.

Substrate 656 may be closer to the curved portion of cover 652 than substrate 658. The illumination unit 606 connected to substrate 656 and the illumination unit 606 on substrate 658 may be configured to emit light at different angles relative to its body. For example, the illumination unit 606 connected to substrate 656 may be configured to emit light at an angle (e.g., 30 degrees, 60 degrees, etc.) relative to its body. This emitted light may follow path 662. Additionally, or alternatively, the illumination unit 606 on substrate 656 may be configured to emit light at a particular angle to direct light through the cover 652 and/or to direct light to a desired sub-portion. The illumination unit connected to substrate 658 may be configured to emit light that aligns with its body. For example, the light emitted from this illumination unit 606 may follow path 660. Additionally, or alternatively, the illumination unit 606 on substrate 658 may be configured to emit light that aligns with its body to direct light through the cover 652 and/or to direct light to a desired sub-portion.

FIGS. 7A-B illustrate example embodiments of an illumination device (e.g., illumination device 104 of FIGS. 1-2) using illumination units 606 on a substrate configured to angle light from the illumination units 606. Specifically, FIG. 7A illustrates the assembly 700 of the illumination device. The assembly 700 includes a cover containing an optical element 702, one or more illumination units 606, substrate 704, and wire 706. FIG. 7B illustrates optical element 702 including inner surface 708, outer surface 710, support 712, ridged structure 714, and ridged structure 716.

Optical element 702 may include an inner and outer surface. The outer surface 710 may be smooth. Additionally, or alternatively outer surface 710 may have a curved profile. The inner surface 708 may include one or more optical elements, such as optical element 702. Optical element 702 may form part of a cover (e.g., cover 602 of FIG. 6), where the cover may also be placed over an image capture device. Optical element 702 may be aligned over one or more illumination units 606. Illumination units 606 may be mounted on substrate 704, such that the orientation of illumination units 606 aligns with the orientation of substrate 704. Wire 706 might provide power to illumination units 606. For example, wire 706 may provide power to illumination units 606 through substrate 704. In one non-limiting embodiment, wire 706 have two ends. One end may connect to substrate 704. The other side may connect to a battery management system, where the battery management system is connected to one or more batteries and allows power to flow through wire 706 to substrate 704.

Substrate 704 may be a type of PCB (e.g., flex PCB, rigid PCB, another type of PCB, etc.). In some embodiments, each illumination unit 606 may be on a different substrate 704. As illustrated in FIGS. 7A-B, optical element 702 may connect to substrate 704 using one or more supports, such as support 712. These supports may additionally connect to substrates, such as substrate 608, and substrate 610. These substrates may be PCBs (e.g., flex PCBs, through-hole PCBs, etc.). Each substrate connects to one or more illumination units 606 such that the illumination units 606 essentially align with the substrate. The illumination units may be LEDs. The LEDs may be IR LEDs. Of course, other types of illumination devices are possible (e.g., incandescent bulbs, halogen bulbs, other illumination devices, or some combination thereof).

This design of optical element optical element 702 may use a one or more ridged structures, such as ridged structure 714 and ridged structure 716. Ridged structures 714 and 716 may be configured to direct light into one or more sub-portions (e.g., sub portions 120 of FIG. 1). For example, For example, in one non-limiting embodiment, the ridged structures 714 and 716 directs light from illumination units 606 into three sub-portions. This may allow illumination to be directed into a ±75-30 degree and ±30 degree field of view of image capture area. In some embodiments, ridged structures 714 and 716 may be different. For example, ridged structures 714 and 716 might have different footprints, the ridges of ridged structures 714 and 716 may have different dimensions, and/or the ridges of ridged structures 714 and 716 may be angled differently. Other differences are also possible. In other embodiments, ridged structures 714 and 716 may be the same (e.g., have the same footprints, ridge dimensions, ridge angles, etc.).

Figure 8B:
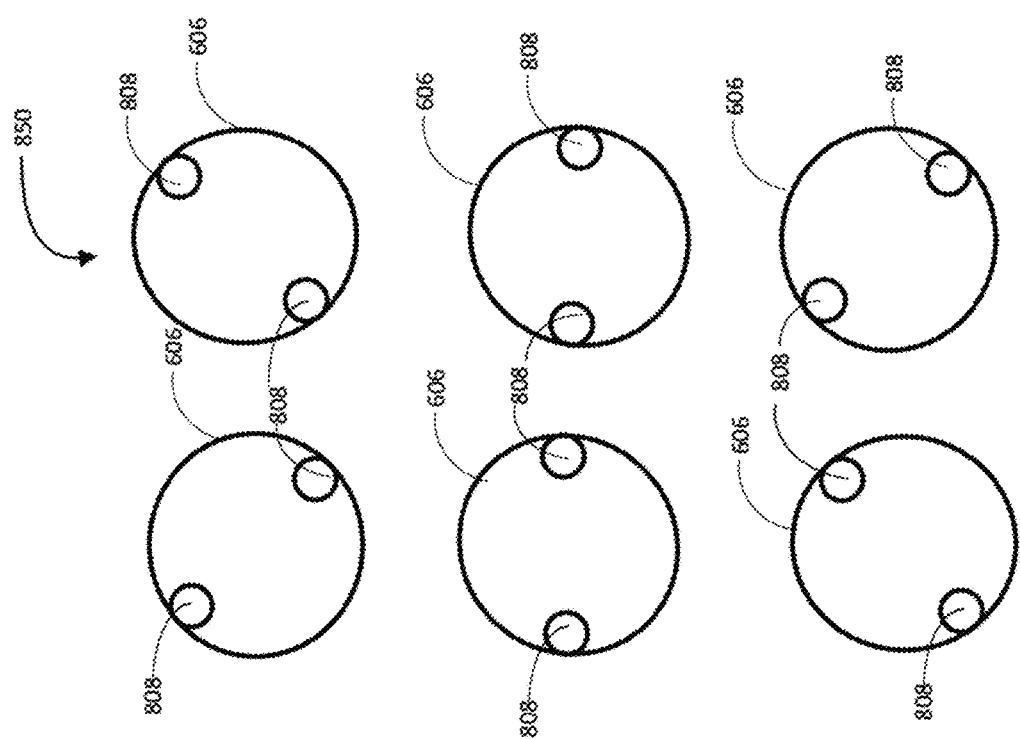
FIG. 8A-B illustrate example embodiments of an illumination device using angled illumination units on a substrate.
Figure 8A:
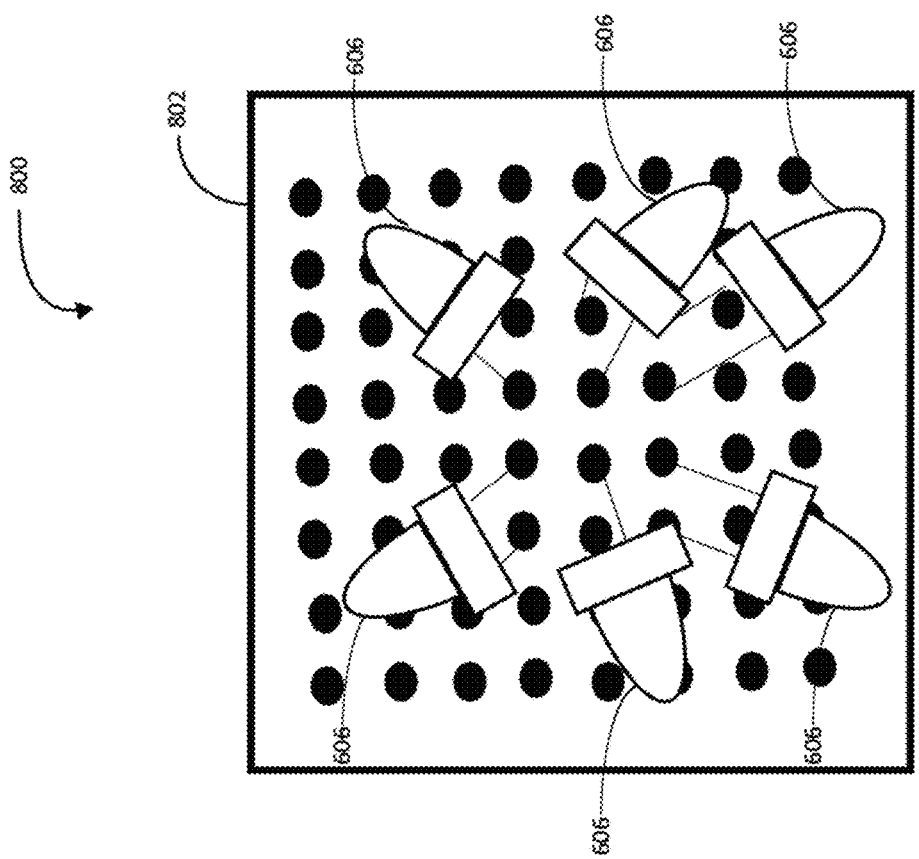

FIGS. 8A-B illustrate example embodiments of an illumination device (e.g., illumination device 104 of FIG. 1) using angled illumination units (e.g., illumination units 606) on a substrate 802. The illumination device may be assembly 800 which includes substrate 802. Substrate 802 may be a PCB (e.g., a flex PCB, a through-hole PCB, etc.). Substrate 802 may be connected to a power source (e.g., a battery) to provide power to the one or more illumination units 606.

Illumination units 606 may be through hole LEDs. In some embodiments, illumination units 606 may be angled respect to substrate 802. Additionally, or alternatively, illumination units 606 may be angled with respect to each other. Illumination units 606 may be angled by changing the lengths of the leads 808 (e.g., by shortening the leads 808 and angling the LEDs before soldering on to substrate 802). Additionally, or alternatively, as illustrated in FIG. 8B as assembly 850, substrate 802 may be configured to optimize the start angles for illumination units 606. In some embodiments, the lengths of the legs on illumination units 606 will incline illumination units 606 the edges of the substrate 802 (e.g., towards the corners, up or down). As will be described in more detail below, the angling of illumination units 606 may facilitate control of illumination of at least two sub-portions (e.g., sub-portions 120 of FIG. 1).

In some embodiments, assembly 800 and/or assembly 850 may include six illumination units 606. This may facilitate control of illumination to six sub-portions (or another number of sub-portions). For example, each illumination unit 606 may be associated with a different sub-portion. A controller on the illumination device associated with illumination units 606 may be configured to generate instructions for each illumination unit 606. For example, an independent driver channel can be assigned for each illumination unit 606. Additionally, or alternatively, independent driver channels can be assigned to correspond with illumination of one or more independent sub-portions. Generating instructions to adjust light emitted from illumination units associated with a sub-portion can adjust illumination in that sub-portion. Illumination patterns may be set to adjust illumination as instructed by an illumination controller.

Figure 10B:
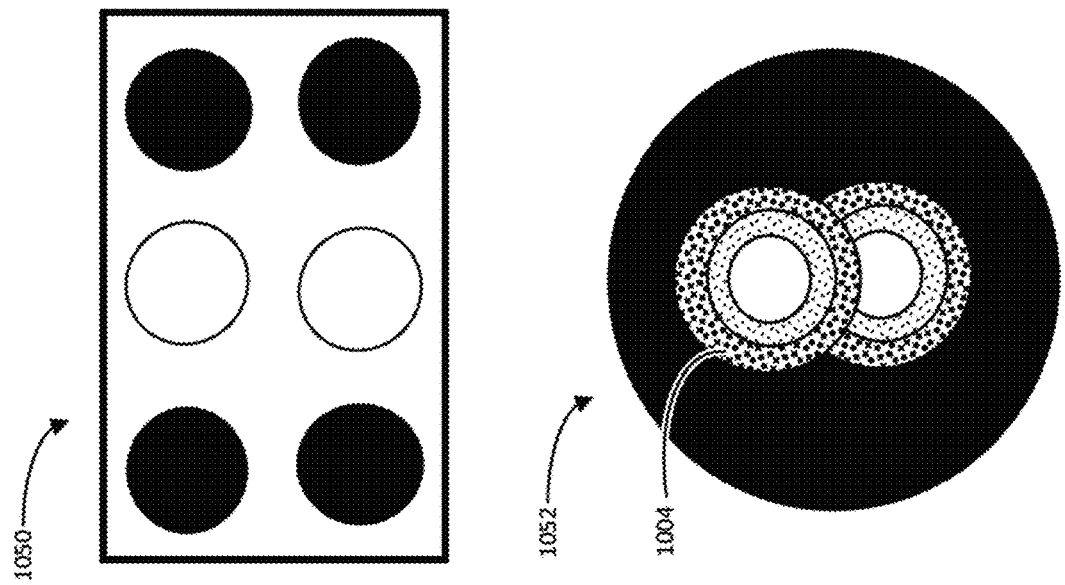
FIG. 10A-B illustrate example embodiments of illumination patterns generated by an illumination device with six illumination units.
Figure 10A:
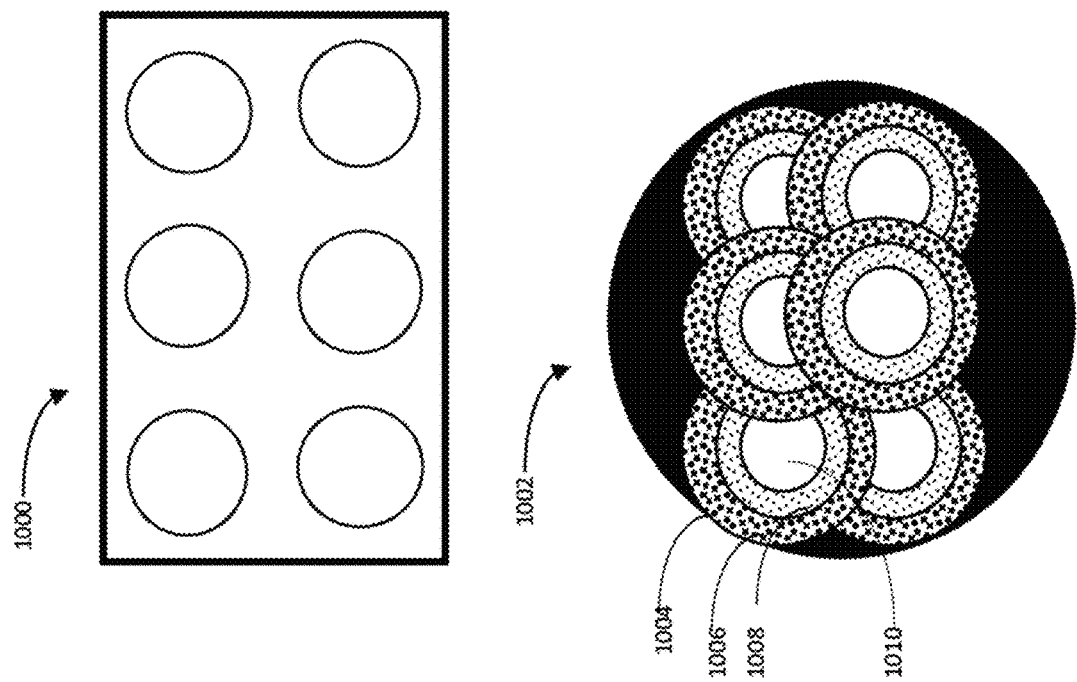

The controls described above may facilitate generation of illumination patterns for more than one sub-portion using two or more illumination units 606. For example, FIG. 10 illustrates illumination patterns that can be generated with six illumination units 606 in a 2×3 array. The controls described above may facilitate generation of multiple illumination patterns by engaging different illumination elements. For example, array 1000 may contain six illumination units (e.g., six illumination units 606 of FIG. 6). Array 1000 may be connected to a controller. In some embodiments, array 1000 may be connected to a controller included in an illumination device (e.g., illumination device 104 of FIG. 1).

In array 1000, all six illumination units may be activated. This may generate an illumination pattern 1002. In contrast, in array 1050, only the illumination units in the center of the array may be activated. This may result in illumination pattern with more illumination provided to a central area of illumination pattern 1002. This may result to illumination being increased in only a central sub-portion of an illumination area.

Activated states are represented by a white circle and deactivated states are represented by a dark circle. Activated illumination units may be illumination units that are configured to emit light. In some embodiments, activated illumination units may be configured to emit light at a maximum intensity. Additionally, activated illumination units may be configured to emit light at a minimum intensity or one or more intermediate intensities.

Light emitted from each illumination unit 606 may overlap to form the illumination patterns. However, in some embodiments, light emitted from each illumination unit 606 may not overlap to form illumination patterns. In further embodiments, light emitted from some illumination units 106 may overlap while light emitted from other illumination devices may not overlap. In other words, light may be emitted to different sub-portions which do not overlap with each other (e.g., left and right).

The light emitted by each illumination unit may have areas of different brightness. These different areas of brightness may be laid out in a radial pattern with the brightness portion in the center. For example, the light emitted by an illumination unit may be represented by illuminated area 1004. Illuminated area 1004, may have a low brightness portion 1010, a medium brightness portion 1008, and a high brightness portion 1010. In some embodiments, light emitted from an illumination unit may have uniform brightness. This uniform brightness level may be achieved through optical elements placed in front of the illumination unit. For example, an optical element, can be placed in front of an element to diffuse the light before it reaches an illumination area such that the brightness at the illumination area associated with the illumination unit is uniform.

Figure 9B:
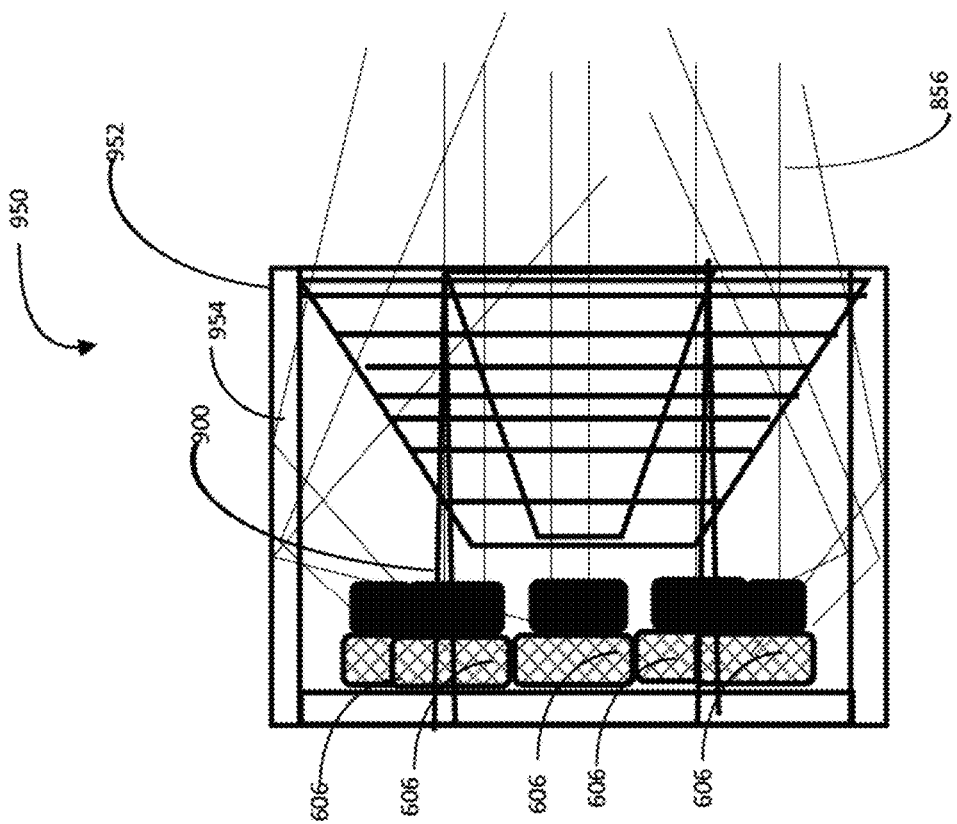
FIG. 9A-B illustrate example embodiments of an illumination device using illumination units with an integrated lens.
Figure 9A:
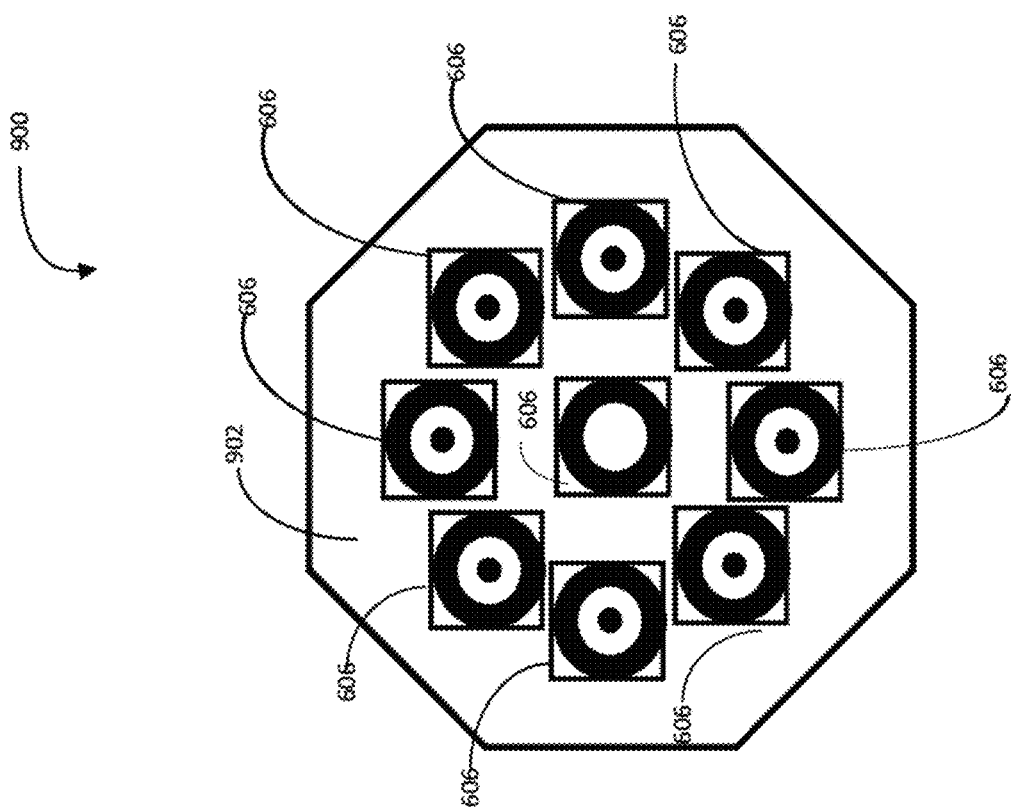

FIGS. 9A-B illustrate example embodiments of an illumination device using illumination units 606 with an integrated lens. Specifically, FIG. 9A illustrates an assembly 900 which includes array of nine illumination units 606 may be arranged on a substrate 902. Assembly 900 may be part of an illumination device (e.g., illumination device 104 of FIGS. 1-2). Substrate 902 may be a type of PCB (e.g., a flex-PCB, a through hole PCB, another type of PCB, or some combination thereof). Substrate 902 may be in an octagon shape. Of course, other shapes are also possible (e.g., rectangle, circle, etc.). Assembly 900 may be configured to have a footprint of specific dimensions. For example, in one non-limiting embodiment, each illumination units 606 has a footprint of 1.6×1.6 mm, and substrate 902 has a footprint of 9×9 mm. These dimensions may facilitate use of assembly 900 within an image capture and control device (e.g., image capture and control device 204 of FIG. 2).

FIG. 9B illustrates an assembly 950 including an optical element 952 and assembly. Optical element 952 may be configured to divert light from each illumination unit 606 to one or more independent sub-portion (e.g., a sub-portion of sub-portions 120 of FIG. 1). For example, optical element 952 may divert light by the alignment and orientation of optical structures included in optical element 952 with respect to illumination units 606. In some embodiments, emitted light might follow optical paths 956 after impacting structures included in optical element 952. In one non-limiting embodiment, optical element 952 may be configured to divert light to generate illumination at sub-portions within a field of view of 150 degrees.

Structures included within optical element 952 may also be considered to be optical elements. One structure included within optical element 952 may be cylinder 954. Cylinder 954 may be made of aluminum. Cylinder 954 may include an inner and outer surface. The inner surface may be reflective internal walls. Optical element 952 may include cylinder 954. Cylinder 954 may be configured to serve as a reflector. Additionally, or alternatively, cylinder 954 may be configured to serve as a support structure for 950. In some embodiments, cylinder 954 may be configured to conduct heat. For example, in some embodiments, cylinder 954 may be used to dissipate heat produced by illumination units 606.

Figure 11:
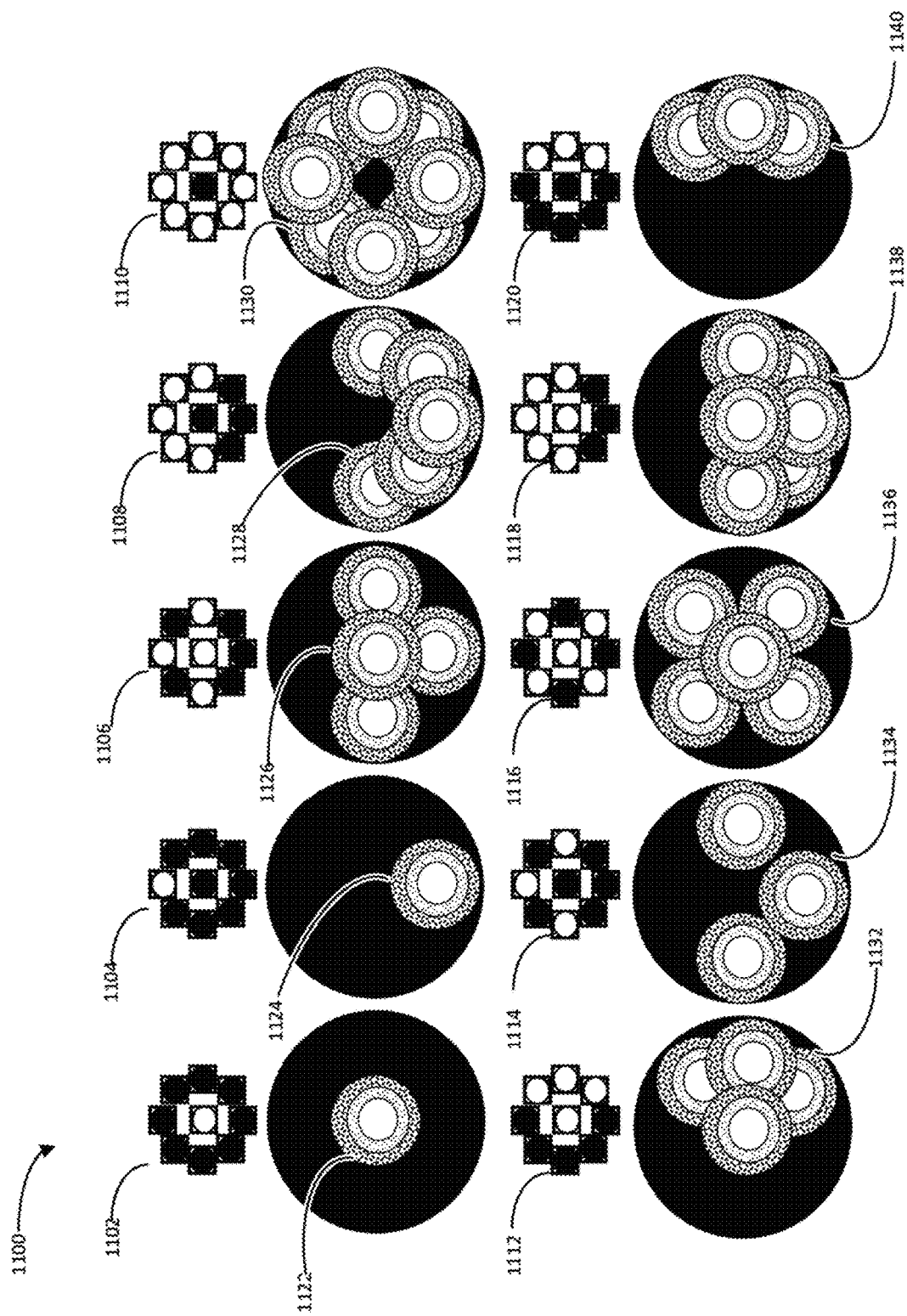
FIG. 11 illustrates example embodiments of illumination patterns generated by an illumination device with nine illumination units.

In some embodiments, assembly 900 and/or assembly 950 may include nine illumination units 606. This may facilitate control of illumination to at least nine sub portions. For example, FIG. 11 illustrates illumination patterns that can be generated with nine illumination units 606, where eight illumination units 606 are arranged around a central illumination unit 606. In some embodiments, each possible illumination pattern may represent a sub-portion (e.g., sub-portions 120 of FIG. 1).

Additionally, or alternatively, each illumination unit 606 may be associated with a different sub-portion. Of course, more than one illumination units 606 may be associated with each sub-portion. As described above, with reference to FIG. 10, a controller on the illumination device associated with illumination units 606 (e.g., illumination device 104 of FIG. 1) may be configured to generate instructions for each illumination unit 606. For example, an independent driver channel can be assigned for each illumination unit 606. Additionally, or alternatively, independent driver channels can be assigned to correspond with illumination of one or more independent sub-portions. Generating instructions to adjust light emitted from illumination units associated with a sub-portion can adjust illumination in that sub-portion. Illumination patterns may be set to adjust illumination as instructed by an illumination controller.

For example, illuminated arrays 1002, 1004, 1106, 1108, 1110, 1112, 1114, 1116, 1118, and 1120 illustrate different configurations of illumination units in activated and deactivated states. Activated and deactivated states may be illustrated as described above, with reference to FIG. 10. Activated and de-activated states can generate illumination patterns that illuminate one or more determined sub-portions. Illumination patterns 1122, 1124, 1126, 1128, 1130, 1132, 1134, 1136, 1138, and 1140 represent illumination patterns generated from the illuminated arrays and correspond to illuminated arrays 1002, 1004, 1106, 1108, 1110, 1112, 1114, 1116, 1118, and 1120, respectively.

As illustrated by illuminated arrays 1102 and 1104, illumination patterns may be generated where only one illumination unit is activated. For example, illuminated array 1102 may have the central illumination unit activated. This may result in illumination pattern 1122, wherein a central sub-portion is illuminated.

The activation of an illumination unit on the outer ring of the illumination array may result in an area on the opposite to the illumination unit's position in the array being illuminated sub-portion being illuminated. This may occur when the illumination unit that has been activated is in the top or bottom of the array. For example, illuminated array 1004 may have a top illumination unit activated and a lower sub-portion is illuminated in illumination pattern 1124. Illuminated array 1106 has four illumination units activated. Three are in a central region of the illuminated array and one is in a top portion of the illuminated array The corresponding illumination pattern 1126 has the central region and a portion of a bottom region illuminated. In contrast, activated units in left and right areas may light up corresponding areas of the illumination pattern. For example, activation of illumination elements on the right of illuminated array 1120 may result in illuminated areas on the right of illumination pattern 1140.

In accordance with one or more preferred implementations, a camera device may also utilize one or more on-axis LED packages, which may be characterized as standard LED packages.

In accordance with one or more preferred implementations, a camera device comprises a first printed circuit board arranged in a first orientation, and a second flex printed circuit board arranged in a second orientation. The second flex printed circuit board includes an on-axis, or standard, LED package coupled thereto. A first direction normal to a front face of the first printed circuit board is different than a second direction representing a general direction that the LED package emits light during operation. That is, the use of the flex printed circuit board allows a standard LED package to be used to emit light generally in a specific direction without having to use an off-axis LED and without having to couple the LED to a printed circuit board at an angle. Instead, the flexibility of the flex printed circuit board allows for orienting of the LED package in a desired direction.

In accordance with one or more preferred implementations, a prismatic structure is molded on an inside of a cover window covering one or more LEDs. In accordance with one or more preferred implementations, this prismatic structure is a Fresnel-type prism array.

In accordance with one or more preferred implementations, software or firmware loaded on a camera device (e.g., a night vision firmware module) implements a control algorithm controlling zonal illumination by LEDs of the camera device.

In accordance with one or more preferred implementations, a sensor image is split into zones, and image signal processor (ISP) automatic exposure (AE) statistics are utilized to determine a current luminance value for each zone. Taking one zone as an example, one or more LEDs associated with that zone are then adjusted to bring the luminance for the zone to the automatic exposure control's (AEC's) Y target, and/or to bring the AEC sensor gain down below a tuned threshold.

In accordance with one or more preferred implementations, a process function is called or executed at a periodic interval, e.g., 500 milliseconds or 333 milliseconds, or at a set rate, e.g., 2 Hz or 3 Hz. In accordance with one or more preferred implementations, such a process function is called or executed more often during initial convergence.

As part of this process function, a statistics grid from an image signal processor of the camera device is retrieved. In accordance with one or more preferred implementations, this grid is decimated to a smaller grid, e.g., an 8×8 grid. In accordance with one or more preferred implementations, ISP statistics are polled at a rate of 3 Hz.

In accordance with one or more preferred implementations, each intended zone for a camera device represents a channel, and an additional channel is defined for all of the zones, e.g., a device with a left zone, a center zone, and a right zone might have a left channel, a right channel, a center channel, and an all channel. For each channel, a weighted average is applied to calculate a set of Y estimates. The Y estimates are combined in a matrix multiply operation to calculate a signal for each channel, e.g., an all channel signal, a left channel signal, a center channel signal, and a right channel signal. Each of the channel signals is fed to a control loop which calculates a new LED target current value for each LED in the subject channel.

In accordance with one or more preferred implementations, each channel implements a control loop via common callback to the same function or algorithm. In accordance with one or more preferred implementations, such a function or algorithm takes as input an AEC Y target value, an AEC output sensor gain value, a channel Y-estimate value, and a gain target threshold.

In accordance with one or more preferred implementations, the AEC Y target value is a linear fraction of white and the current AEC setpoint. In accordance with one or more preferred implementations, the automatic exposure control will adjust the sensor to pull global Y to this value. In accordance with one or more preferred implementations, this value varies slowly with time and is lower in darker scenes.

In accordance with one or more preferred implementations, the AEC output sensor gain value is the linear analog gain being sent to the sensor. In accordance with one or more preferred implementations, this value is a proxy for noise in an image. In accordance with one or more preferred implementations, if this value is high, noise should be reduced by increasing the signal by increasing current to the corresponding one or more LEDs for that channel. If this value is low, current to the corresponding one or more LEDs for that channel can be reduced.

In accordance with one or more preferred implementations, a zone Y estimate is a linear fraction of white, and a gain target threshold is a linear analog gain value which has acceptable noise and is in a "dark" regime.

In accordance with one or more preferred implementations, a function or algorithm calculates an ideal gain for LED brightness based on a linear combination of the inputs.

In accordance with one or more preferred implementations, a proportion of the ideal gain is then applied to a current LED current value to determine a new target current value for that LED.

As a first example, a delta value can be calculated as delta=(y*gain_threshold)/(y_target*gain), and a new target current value for an LED new_led can be determined based on the delta and a previously current LED current value old_led, e.g., new_led=pid (delta, old_led). This determined target current value is then used to change the amount of current being supplied to the LED, thus changing the illumination of the scene.

As a second example, at a rate of 3 Hz, individual zone Y values are determined as well as a current AEC Y target value and a current camera analog gain value. A tunable target gain threshold value (e.g., corresponding to a minimum amount of noise that is tolerable for an image) that has been selected or tuned is utilized as well. For each channel or zone, a first value A is calculated by dividing the current Y value for that zone by the current AEC Y target value, and a second value B is calculated by dividing the current camera analog gain value by the tunable target gain threshold value. An error value for a channel or zone is determined based on dividing B by A. A proportional control is applied to increase the current supplied to the corresponding one or more LEDs for that channel or zone until B=A (or is within a threshold amount to it or B/A or A/B is within a threshold distance to 1). In accordance with one or more preferred implementations, this adjusts the one or more LEDs for a zone or channel until images are correctly exposed with a sensible noise value.

In accordance with one or more preferred implementations, a camera device utilizes a signal or data from an ambient light sensor (e.g., a lux signal) to determine when to switch into or out of a night vision mode. In the night vision mode, LEDs (such as IR LEDs) are enabled, while in a day mode, LEDs are disabled. In accordance with one or more preferred implementations, enabling/disabling or activation/deactivation of visible light LEDs is or can be decoupled from that of IR LEDs. An approach utilizing a signal or data from an ambient light sensor to determine when to switch in or out of a night mode can experience difficulty in the presence of objects close to the camera device. These close objects are dark when lit by external low-lux light sources but get very bright when LEDs light them up. So, a camera device might go into night mode, turn on the LEDs and find that the "lux" is now above a night-to-day transition threshold.

In accordance with one or more preferred implementations, a solution is utilized which addresses this problem. In accordance with one or more preferred implementations, an image sensor of a camera device is utilized as a high sample rate lux meter, and data collected is utilized to facilitate determination of whether to transition from a night mode to a day mode.

In accordance with one or more preferred implementations, a coupling detection approach estimates the photon flux entering the camera and compares the relative steps in flux against steps in LED brightness.

In accordance with one or more preferred implementations, a light flux value light_flux is defined based on an average Y value, an exposure time, and a gain value as light_flux ~=average_Y/(exposure_sec*gain). A change in flux delta_flux is determined based on a current flux value flux [n] and a previous flux value flux [n−1] as delta_flux=flux [n]/flux [n−1]. A change in an LED value (e.g. an LED current value or an LED brightness value) delta_led is determined based on a current LED value (e.g. an LED current value or an LED brightness value) and a previous LED value (e.g. an LED current value or an LED brightness value) as delta_led=led_out [n]/led_out [n−1].

In accordance with one or more preferred implementations, an angular slope value for the change in an LED value is compared to an angular slope value for the change in flux. If these are well-coupled, then both these quantities will have the same slope and result in zero difference. If a nearby object moves, or the external light changes, the signal will change independently of the LED brightness. Thus, the flux slope will be different than the LED slope, indicating there is not a tight coupling. In accordance with one or more preferred implementations, since the outside influences vary with time, a determined coupling value is filtered with an infinite impulse response (IIR) filter.

In accordance with one or more preferred implementations, a flux slope value slope_f for the change in flux delta_flux is determined as slope_f=arctan (delta_flux) in radians. An LED slope value slope_l for the change in an LED value delta_led is determined as slope_l=arctan (delta_led) in radians.

In accordance with one or more preferred implementations, a coupling value is determined as coupling=1.0−(slope_f-slope_l) or coupling=1.0-abs (slope_f-slope_l) and is clipped to a range of 0 to 1 (where abs ( ) determines the absolute value).

In accordance with one or more preferred implementations, a determined coupling value is compared to a threshold to determine whether to transition from night to day mode.

In accordance with one or more preferred implementations, a confidence value is calculated based on a relative LED step. The smaller the relative LED step, the less confident we are in the coupling (and the smaller the confidence value).

In accordance with one or more preferred implementations, a camera device periodically compares a determined coupling value to a threshold and holds the camera device in night mode if the coupling value is above (or >=) a threshold (e.g., 0.5) and a confidence value is above (or >=) another threshold.

In accordance with one or more preferred implementations, if a coupling value and confidence value do not meet the respective thresholds, a timer or counter is started if one or more coupling values and confidence values determined before expiration of the timer do not satisfy the respective thresholds. This avoids dropping out of night mode owing to a single off measurement or bad estimate. As dawn approaches, outside illumination generally increases smoothly causing the coupling to go down, with the LED having little effect on the scene by the time a day to night transition would typically happen.

In accordance with one or more preferred implementations, when a camera device switches to night mode, one or more LEDs are stepped (e.g., in provided current) to allow for determination of one or more coupling values.

In accordance with one or more preferred implementations, while in night mode, a camera device periodically determines a coupling value (e.g., based on a change in photon flux). In accordance with one or more preferred implementations, based on a coupling value below (or <=) a threshold, one or more LEDs are stepped (e.g., in provided current) to allow for determination of one or more coupling values.

In accordance with one or more preferred implementations, upon entering night mode, a camera device steps one or more LEDs until it has a noticeable effect, and then enters an adaptive mode (e.g., utilizing zonal adaptive lighting as described herein).

In accordance with one or more preferred implementations, approaches disclosed herein are implemented in a camera device such as a security camera device or a video doorbell device. In some instances, the device may include a housing and a base plate that couples to the housing for disposing the device on a surface (e.g., wall). The housing may include various computing components, such as an imaging sensor (e.g., camera), light emitting elements (e.g., light emitting diodes (LEDs)), RADAR sensor, passive infrared (PIR) sensor(s), microphone(s), and so forth for detecting motion, recording audio and/or video, and so forth within an environment of the device, respectively. A button, for example, may receive touch input for controlling one or more operations of the device. For example, in response to detecting a press of the button, the imaging sensor may be capturing image/video data. In addition, the housing may include one or more speaker(s) (e.g., mid-range speaker, tweeter speaker, subwoofer speaker) for outputting sound within the environment. The housing may house a battery of the device, which may connect to computing components of the device via a waterproof connector.

The device may include a front, a back, a top, a bottom, and adjacent lateral sides. In some instances, the imaging sensor, the PIR sensor(s), and/or the RADAR sensor are oriented towards the front and/or sides of the device. In some instances, the PIR sensor(s) and the RADAR sensor may be located closer to the top of the device than the imaging sensor. Additionally, the RADAR sensor may be located between the PIR sensor(s). In some instances, the PIR sensor(s) and the RADAR sensor are horizontally aligned, and/or the RADAR sensor and the imaging sensor may be vertically aligned.

The imaging sensor, the PIR sensor(s), and/or the RADAR sensor may serve to detect motion within an environment of the device. For example, image processing on image/video data captured by the imaging sensor may be used to detect persons (or other objects of interest). The PIR sensor(s) may detect or receive mid-IR light emitted by persons (e.g., according to a temperature of the person). The RADAR sensor, meanwhile, may be used to determine polar coordinates (or a position) of persons. In some instances, the RADAR sensor may enable the device to focus on object detection and capabilities to operate in low power modes. In some instances, the imaging sensor, the PIR sensor(s), and/or the RADAR sensor may be used in combination to detect persons, and in response, capture video and/or audio data. For example, upon mid-IR (e.g., motion) being detected via the PIR sensor(s), the imaging sensor may begin recording image/video data. In addition, the imaging sensor may begin recording image/video data in response to a press of the button. In some instances, the imaging sensor, the PIR sensor(s), and/or the RADAR sensor enable the device with 3D motion detection.

The button may be located vertically beneath the imaging sensor. In some instances, the button is located closer to the bottom of the device than the imaging sensor, the RADAR sensor, and/or the PIR sensors. In some instances, the button is vertically aligned with the RADAR sensor and/or the imaging sensor. A light ring, for example, may at least partially surround the button and illuminate according to certain appearance states. In some instances, the light may be output through the light ring in response to motion being detected, a press of the button, and so forth.

The device may include various lighting elements for illuminating the environment, illuminating the light ring, and for enabling the camera(s) to capture image/video data and/or motion detection. For example, the lighting elements may be disposed beneath the light ring. The lighting elements may also include infrared (IR) lighting elements to enable the imaging sensor to capture image/video data in low-light conditions (e.g., nighttime). In some instances, the IR lighting elements may output IR light in front of, and/or to the sides of, the device. In some instances, first IR lighting elements may be disposed to a first side of the imaging sensor, while second IR lighting elements may be disposed to a second side of the imaging sensor. In some instances, the IR lighting elements are located closer to the top of the device than the bottom. Additionally, in some instances, the IR lighting elements may be horizontally aligned on the device.

The device may include a frame that orients the PIR sensor(s) towards the sides, the top, and/or the front of the device. The PIR sensor(s) and the frame may couple to the housing. In some instances, the frame includes two cavities for receiving two PIR sensors. In some instances, the device includes mirrors coupled to the frame, and where the PIR sensors are oriented towards the mirrors, respectively. For example, the mirrors may be configured to reflect light in a direction towards the PIR sensors, respectively. The mirrors may increase a field of view of the PIR sensor(s). In instances in which the device includes two mirrors, a first of the PIR sensors may be oriented towards a first mirror, vice versa, and a second of the PIR sensors may be oriented towards a second mirror, vice versa.

In some instances, the imaging sensor, the RADAR sensor, one of the first IR lighting elements, and one of the second IR lighting elements are oriented in a first direction (e.g., towards the front). In some instances, another of the first IR lighting elements is oriented in a second direction (e.g., towards the front/first side), and another of the second IR lighting elements is oriented in a third direction (e.g., towards the front/second side). In some instances, the first PIR sensor is oriented in a fourth direction and the second PIR sensor is oriented in a fifth direction.

The device may include microphone(s) for capturing audio within the environment. In some instances, the microphone(s) are arranged on or across the front of the device. In some instances, the microphone(s) may be located between the imaging sensor and the top of the device. In some instances, the microphone(s) may be located closer to the top of the device than the imaging sensor. In some instances, the microphones are located vertically beneath the PIR sensor(s) and the RADAR sensors. As such, in some instances, the PIR sensor(s) and/or the RADAR sensor may be located closer to the top of the device than the microphone(s). In some instances, the microphone(s) may include at least two microphones for noise cancellation, directionality, and so forth. In some instances, a first of the microphones represents an external microphone for capturing audio external to the device, while a second microphone may represent an internal microphone for capturing audio interior to the device. The microphone(s) may be oriented in the first direction (e.g., towards the front).

In some instances, the device may include a status indicator (e.g., RGB LED) located on the front of the device that indicates an operational status of the device. For example, the status indicator may indicate whether the microphone(s) are recording audio, whether the camera(s) are capturing video, and so forth. The device may also include an ambient light sensor that is used to transition the device to night mode (e.g., low light conditions). The ambient light sensor may be located between the imaging sensor and the button. In some instances, the lighting elements and the light ring disposed about the button may represent the status indicator.

In some instances, one or more printed circuit boards (PCBs), printed circuit board assemblies (PCBAs), and/or flexible printed circuits (FPCs) are disposed within the housing. In some instances, a first PCB may include the RADAR sensor, a second PCB may include the connector for connecting to a battery of device, and a third PCB may include the PIR sensors and/or the imaging sensor. The third PCB may additionally include network interfaces (e.g., antenna(s)) for wirelessly coupling the device to one or more remote devices (e.g., mobile device, laptop, etc.) over one or more networks (e.g., Cellular, Wi-Fi, BLE, Bluetooth, etc.). In some instances, the third PCB may be disposed between the first PCB, which is located more proximate to the front of the device, and the second PCB, which is located more proximate to the back of the device. Additionally, a first FPC may include the microphone(s), the IR lighting elements, and/or the ambient light sensor, while a second FPC may include the button and the lighting elements for illuminating the light ring. The PCBAs, the PCBs, and the FPCs, as well as other computing components of the device, may be communicatively coupled to one another via one or more flex circuits, wires, connectors, and so forth.

The device may include one or more covers, windows, and/or lenses disposed over the imaging sensor, the PIR sensor(s), the RADAR sensor, the lighting elements, etc. For example, a first cover may be disposed over the PIR sensors and the RADAR sensor, a second cover may be disposed over speakers of the device, and/or define an aperture through which the button is accessible and the lighting elements emit light, a third cover may be disposed over the first IR lighting elements disposed to the first side of the imaging sensor, and a fourth cover may be disposed over the second IR lighting elements disposed to the second side of the imaging sensor. A lens may be disposed over the imaging sensor and/or the ambient light sensor. In some instances, the covers, windows, and/or lenses may couple to the housing, at the front and/or along the sides of the device. Additionally, the covers, windows, and/or lenses may include a material that is transparent or translucent to permit the PIR sensor(s) to detect motion and the imaging sensors to record video, for example. Example materials may include glass and polycarbonate. The windows and/or lenses may also reduce glare (e.g., anti-glare coatings) to increase a quality of videos being captured.

The housing defines various receptacles for receiving the PCBs, PCBAs, FPCs, sensor(s), and so forth. In addition, the housing may define a receptacle for receiving the battery. Various receptacles of the housing also accommodate the imaging sensor, the IR lighting elements, the PIR sensor(s), and so forth. Additionally, in some instances, the device includes a frame that supports the first FPC and/or the PIR sensor(s). The frame, for example, may orient the PIR sensor(s) within the environment. The housing and the frame may also include various alignment mechanisms, such as tabs, pins, slits, and so forth for aligning components within the device. For example, prongs extending from the housing and/or the frame may be disposed through openings on the PCBAs, the PCBs, and the FPCs for aligning the PCBAs, the PCBs, and the FPCs within the device).

The device includes the speakers for outputting sound into the environment. In some instances, the speakers are arranged to output sound towards the sides of the device. For example, a first speaker may be oriented towards a first side of the device, while a second speaker may be oriented towards a second side of the device. The second cover may include orifices for permitting sound to travel from the speakers to an exterior of the device. In some instances, a speaker grill and/or other membranes are disposed over the speaker.

The device includes the battery connector for connecting the battery to the second PCB, for example. In some instances, the battery connector is disposed between the connector of the second PCB and contacts of the battery. The connector of the second PCB, for example, may include pins that engage with prongs of the battery connector. The prongs additionally engage with the contacts of the battery such that power may be routed from the battery to the second PCB, and onto the rest of the device. In some instances, the battery connector includes a body, where the prongs are disposed through the body, and a seal that is disposed at least partially around the body. The pins of the connector may be biased into contact with the prongs of the battery connector, such as a first end thereof, while a second end of the prongs may include a curvature (e.g., bend, etc.) that provides a biasing force to the second end to maintain contact with the battery (i.e., with the contacts).

In some instances, the battery connector is designed to protect components of the device from water damage. For example, the seal, which may include ribs that engage within a receptacle (e.g., slot, passage, etc.) of the housing, may prevent the ingress of liquid into the device. The battery connector, such as the prongs engaging with the contacts of the battery and the pins, permits a quick-release or case of connecting and disconnecting the battery.

In some instances, heat dissipating elements are included to disperse heat generated by components of the device. By way of example and not limitation, the imaging sensor, lighting elements, power supply, network interfaces, and so forth generate heat during use. Without effectively dispersing or dissipating this heat, the internal components, such as the imaging sensor, may be adversely affected and become uncappable of performing its intended function. To efficiently dissipate heat generated by the components, heat dissipating elements may be included to transfer heat away from generating sources toward an exterior of the device, and/or to uniformly distribute the heat over the surface area of the device.

In some instances, the device may include a setup button located within the second cover. For example, removing the second cover may expose the setup button. For example, as part of an out of box experience (OOBE), the setup button may be pressed to setup the device. The device may additionally include buttons that correspond to a mute button, a synchronization button, a reset button, a volume button, and so forth. Components of the device may be manufactured using any suitable manufacturing technique, such as blow molding, injection molding, stamping, and so forth. Additionally, suitable materials include metals, composites, plastics, and/or any combination thereof.

Figure 13:
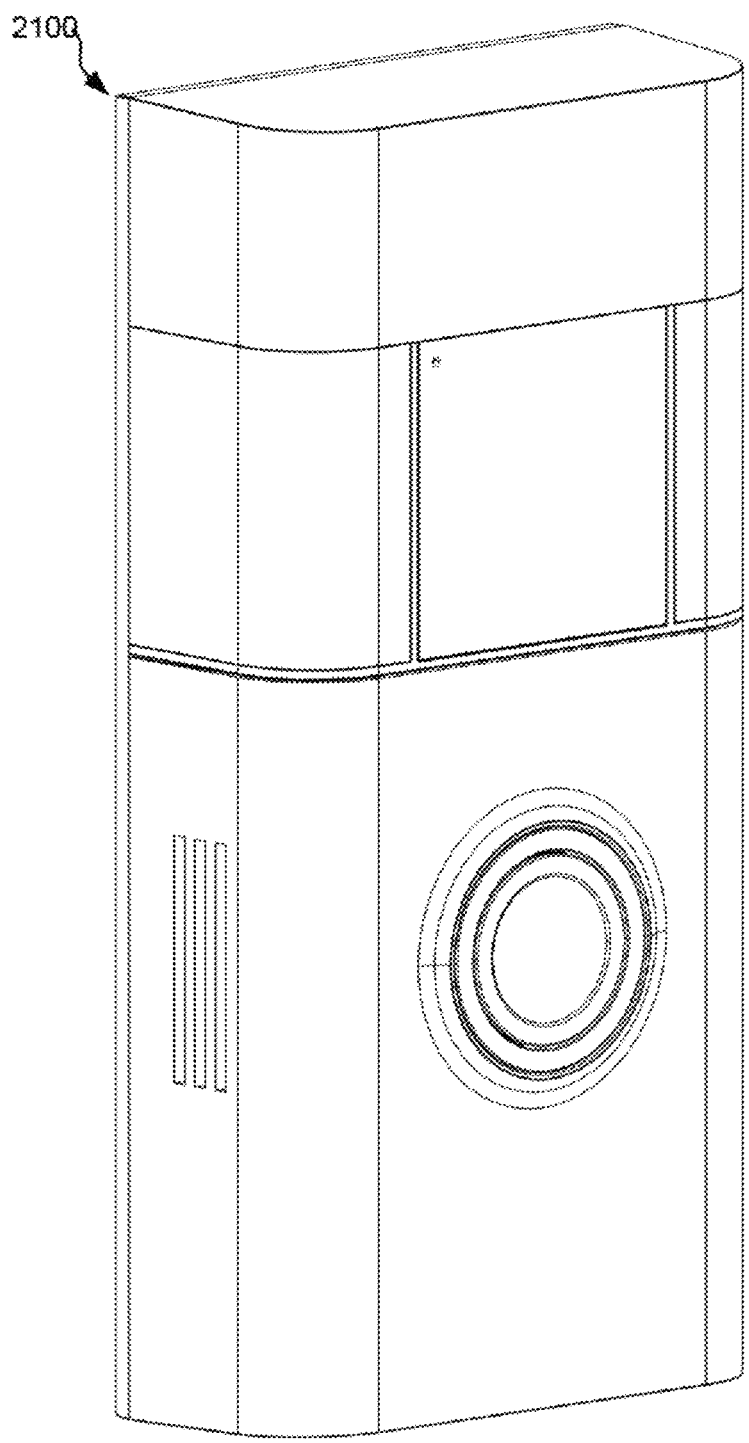
FIGS. 13-16 illustrate a camera device in accordance with one or more preferred implementations.

FIG. 13 illustrates a video doorbell device 2100 in accordance with one or more preferred implementations. The device 2100 includes a front, a back spaced apart from the front (e.g., in the Z-direction), a top 2106, a bottom 2108 spaced apart from the top 2106 (e.g., in the Y-direction), and adjacent lateral sides, such as a first side 2110 and a second side 2112 spaced apart from the first side 2110 (e.g., in the X-direction). In some instances, the device 2100 may include a base plate for disposing the device 2100 along one or more surfaces, such as a wall.

Figure 14:
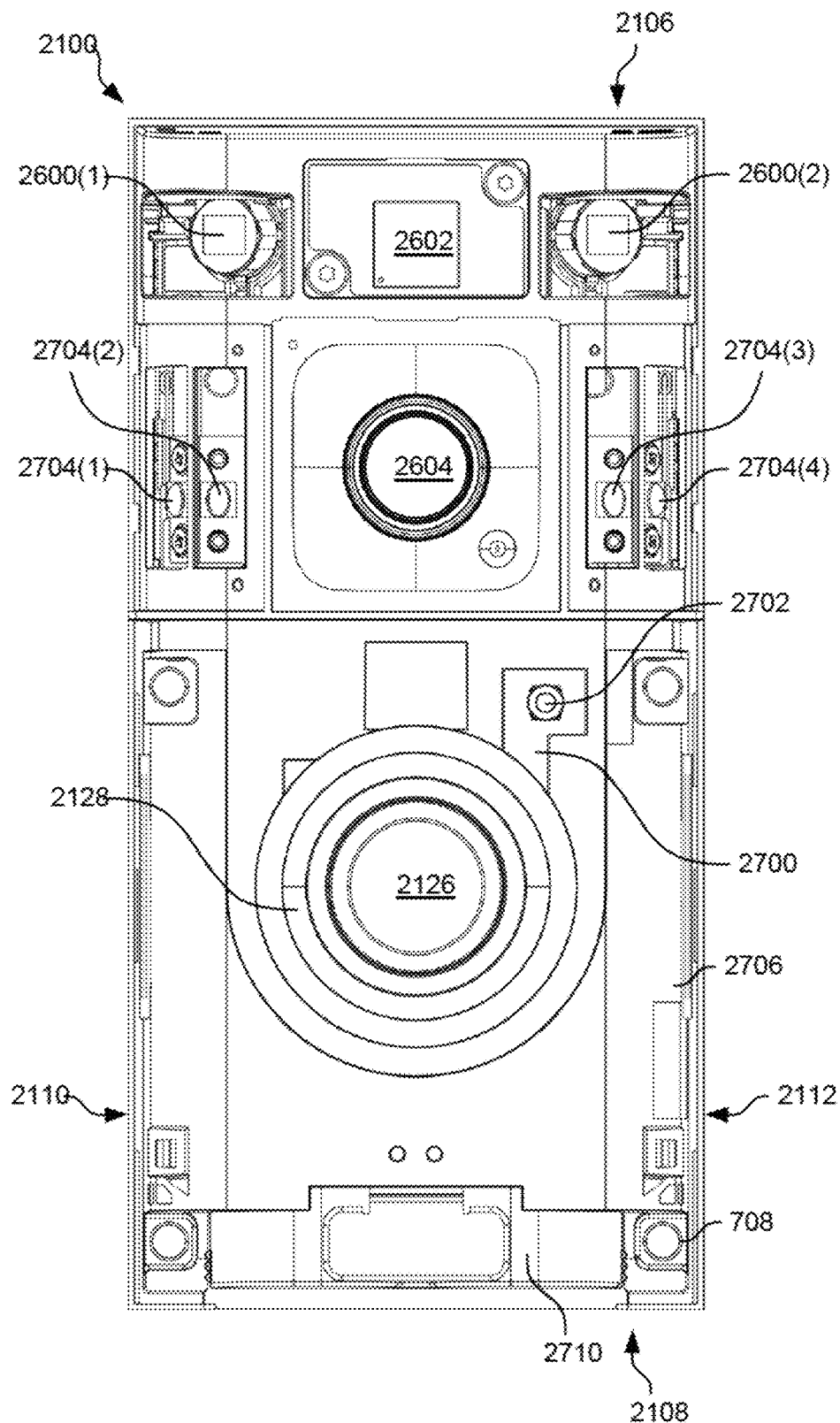
Figure 15:
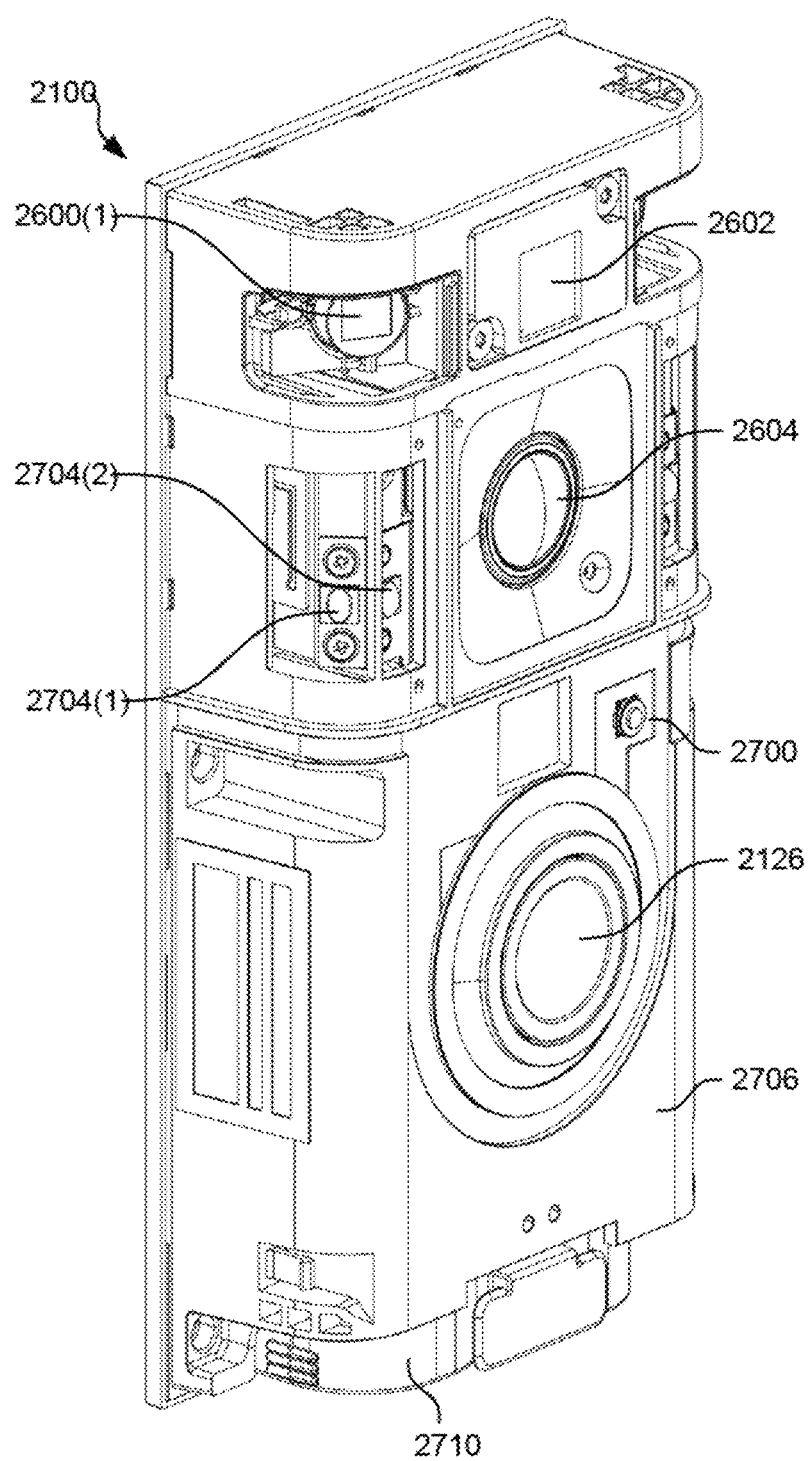
Figure 15:
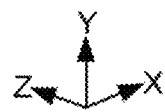
Figure 16:
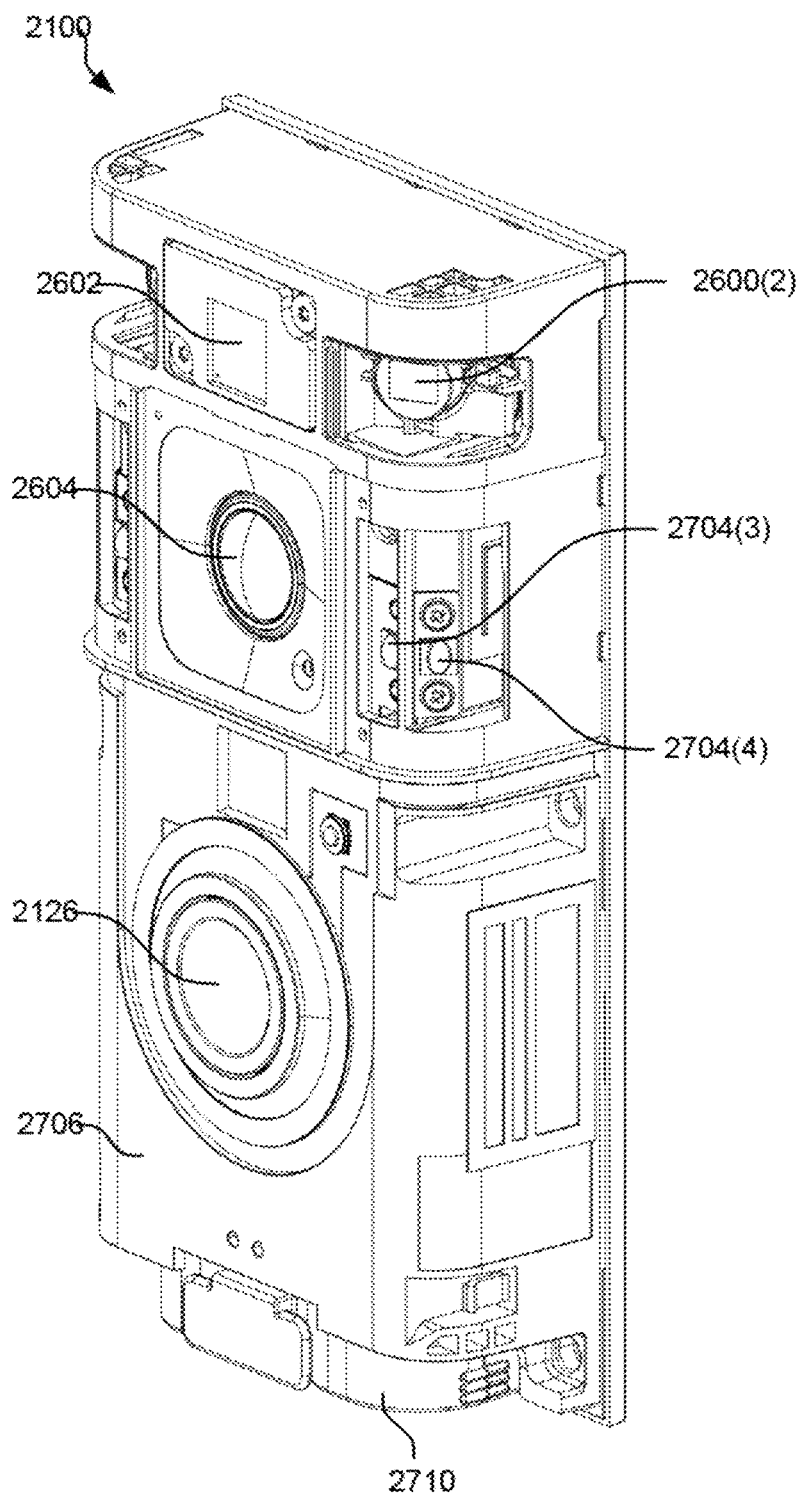

FIGS. 14-16 illustrate the device 2100, showing one or more covers and lenses removed to illustrate components of the device 2100.

The device 2100 includes a first PIR sensor 2600(1), a second PIR sensor 2600(2), and a RADAR sensor 2602 arranged beneath the first cover 2116. The PIR sensor(s) 2600 are oriented to sense motion in front of and/or to the sides of the device 2100, for example, via sensing mid-IR light emitted by persons. The first PIR sensor 2600(1) may be oriented towards the front and/or the first side 2110, while the second PIR sensor 2600(2) may be oriented towards the front and/or the second side 2112. The RADAR sensor 2602 may be disposed between the first PIR sensor 2600(1) and the second PIR sensor 2600(2). In some instances, the RADAR sensor 2602 may be used to determine polar coordinates (or a position) of persons. In some instances, the RADAR sensor 2602 may enable the device 2100 to focus on object detection and capabilities to operation in low power modes. In some instances, the first PIR sensor 2600(1), the second PIR sensor 2600(2), and/or the RADAR sensor 2602 are horizontally aligned.

The device 2100 also includes an imaging sensor 2604 (e.g., camera, depth sensor, etc.) arranged beneath a lens. As shown, the imaging sensor 2604 may be disposed between the RADAR sensor 2602 and the button 2126. In some instances, the imaging sensor 2604 is vertically aligned with the RADAR sensor 2602 and/or the button 2126. In some instances, the imaging sensor 2604, the PIR sensor(s) 2600, and/or the RADAR sensor 2602 may be used in combination to detect persons, and in response, capture video and/or audio data. For example, upon mid-IR (e.g., motion) being detected via the PIR sensor(s) 2600, the imaging sensor 2604 may begin recording video/image data.

As discussed above, the button 2126 may be oriented in the first direction (e.g., outwards from the front 2102). In some instances, the imaging sensor 2604 and the RADAR sensor 2602 may additionally be oriented in the first direction. The first speaker may be oriented in the second direction, outward from the first side 2110, and the second speaker may be oriented in the third direction, outward from the second side 2112. In some instances, the first PIR sensor 2600(1) may be oriented in a fourth direction that is different than the first direction and the second direction, and the second PIR sensor 2600(2) may be oriented in a fifth direction that is different than the first direction and the third direction. In some instances, the fourth direction is oriented at forty-five degrees from the first direction and/or the fifth direction is oriented at forty-five degrees from the first direction.

The device 2100 includes a flexible printed circuit (FPC) 2700 arranged beneath a cover. In some instances, the button 2126 communicatively connects to, or is disposed on, the FPC 2700. Additionally, as will be discussed herein lighting elements that emit light through the light ring 2128 may be disposed on the FPC 2700. The FPC 2700 may also include a button 2702, which in some instances, may correspond to a setup button of the device 2100. The button 2702 may be accessed via removing a cover, for example, during setup of the device 2100.

The device 2100 includes one or more IR lighting elements 2704, such as a first IR lighting element 2704(1), a second IR lighting element 2704(2), a third IR lighting element 2704(3), and a fourth IR lighting element 2704(4). In some instances, the first IR lighting element 2704(1) and the second IR lighting element 2704(2) are disposed beneath the third cover 2130, while the third IR lighting element 2704(3) and the fourth IR lighting element 2704(4) may be disposed beneath the fourth cover 2132. As such, the first IR lighting element 2704(1) and the second IR lighting element 2704(2) may be disposed on a first side of the imaging sensor 2604, while the third IR lighting element 2704(3) and the fourth IR lighting element 2704(4) may be arranged on a second side of the imaging sensor 2604. In some instances, the first IR lighting element 2704(1) is arranged to output light from the first side 2110 of the device 2100, while the second IR lighting element 2704(2) is arranged to output light from the front 2102 of the device 2100. Additionally, or alternatively, in some instances, the third IR lighting element 2704(3) is arranged to output light from the front 2102 of the device 2100, while the fourth IR lighting element 2704(4) is arranged to output light from the second side 2112 of the device 2100.

In some instances, the first IR lighting element 2704(1), the second IR lighting element 2704(2), the third IR lighting element 2704(3), and the fourth IR lighting element 2704(4) are horizontally aligned. In some instances, the IR lighting elements 2704 are arranged closer to the top 2106 of the device 2100 than the bottom 2108. Additionally, or alternatively, the imaging sensor 2604 may be located closer to the top 2106 of the device 2100 than the IR lighting elements 2704. Although a certain number of the IR lighting elements 2704 are shown, the device 2100 may include more than or less than four of the IR lighting elements 2704. Additionally, the IR lighting elements 2704 may be arranged differently than shown.

The device 2100 may include a housing 2706 to which components of the device 2100 couple. The housing 2706 may define various openings, channels, passages, flanges, mounts, etc. to which components of the device 2100 couple. For example, the housing 2706 may define apertures through which the IR lighting elements 2704 are arranged to output light into the environment. The housing 2706 may define channels 2708 through which fasteners are disposed for coupling the device 2100 to a surface. The channels 2708 may be aligned with channels 300 of a base plate. Additionally, the housing 2706 may define a receptacle within which a battery 2710 of the device 2100 can be removably received.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.) The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A camera device comprising:
   a first light emitting diode (LED);
   a second LED;
   a camera having a field of view (FOV);
   one or more processors; and
   one or more non-transitory computer readable media storing processor-executable instructions which, when executed by the one or more processors, cause the camera device to perform operations comprising:
      determining an automatic exposure control luma target value,
      determining an automatic exposure control sensor gain value,
      determining a gain target threshold,
      receiving image data generated by the camera at a first time, the image data comprising first image data and second image data, the first image data defined with reference to a first set of pixel locations representing a first portion of the FOV of the camera at the first time, and the second image data defined with reference to a second set of pixel locations representing a second portion of the FOV of the camera at the first time,
      determining, based on the first image data, a first luma estimate value for a first channel associated with the first portion of the FOV of the camera,
      modifying an amount of current provided to a first LED associated with the first channel based on the automatic exposure control luma target value, the first luma estimate value for the first channel, the automatic exposure control sensor gain value, and the gain target threshold,
      determining, based on second image data generated by the camera that corresponds to a second portion of the FOV of the camera, a second luma estimate value for a second channel associated with a second portion of the FOV of the camera, and
      modifying an amount of current provided to a second LED associated with the second channel based on the automatic exposure control luma target value, the second luma estimate value for the second channel, the automatic exposure control sensor gain value, and the gain target threshold.

2. The camera device of claim 1, wherein the one or more non-transitory computer readable media store processor-executable instructions which, when executed by the one or more processors, cause the camera device to perform operations comprising:
   determining a first value equal to a product of:
      the first luma estimate value for the first channel divided by the automatic exposure control luma target value, and
      the gain target threshold divided by the automatic exposure control sensor gain value,
   determining an updated electrical current value based on the first value and a previous electrical current value associated with the first LED; and
   wherein the modifying of an amount of current provided to the first LED is based on the updated electrical current value.

3. The camera device of claim 1, wherein the one or more non-transitory computer readable media store processor-executable instructions which, when executed by the one or more processors, cause the camera device to perform operations comprising:
 determining a first value based on the first luma estimate value for the first channel and the automatic exposure control luma target value,
 determining a second value based on the automatic exposure control sensor gain value and the gain target threshold, and
 determining a third value based on a division operation involving the first value and the second value,
wherein the modifying of an amount of current provided to the first LED is based on the third value.

4. A camera device comprising:
 a first light emitting diode (LED);
 a camera having a field of view (FOV);
 one or more processors; and
 one or more non-transitory computer readable media storing processor-executable instructions which, when executed by the one or more processors, cause the camera device to perform operations comprising:
  determining an automatic exposure control luma target value,
  determining an automatic exposure control sensor gain value,
  receiving image data generated by the camera at a first time, the image data comprising first image data and second image data, the first image data defined with reference to a first set of pixel locations representing a first portion of the FOV of the camera at the first time, and the second image data defined with reference to a second set of pixel locations representing a second portion of the FOV of the camera at the first time,
  determining, based on the first image data, a first luma estimate value for a first channel associated with the first portion of the FOV of the camera,
  determining a gain target threshold,
  determining an updated electrical current value based on the automatic exposure control luma target value, the automatic exposure control sensor gain value, the first luma estimate value for the first channel, and the gain target threshold, and
  modifying, based on the updated electrical current value, an amount of current provided to a first LED associated with the first channel.

5. The camera device of claim 4, wherein the one or more non-transitory computer readable media store processor-executable instructions which, when executed by the one or more processors, cause the camera device to perform operations comprising
 determining a first value equal to a product of:
  the first luma estimate value for the first channel divided by the automatic exposure control luma target value, and
  the gain target threshold divided by the automatic exposure control sensor gain value; and
 wherein the updated electrical current value is determined based on the first value.

6. The camera device of claim 4, wherein the updated electrical current value is determined based on the first value and a previous electrical current value associated with the first LED.

7. The camera device of claim 4, wherein the one or more non-transitory computer readable media store processor-executable instructions which, when executed by the one or more processors, cause the camera device to perform operations comprising:
 determining a first value equal to a product of:
  the first luma estimate value for the first channel divided by the automatic exposure control luma target value, and
  the automatic exposure control sensor gain value divided by the gain target threshold; and
 wherein the updated electrical current value is determined based on the first value.

8. The camera device of claim 4, wherein the updated electrical current value is determined based on the first value and a previous electrical current value associated with the first LED.

9. The camera device of claim 4, wherein the camera device comprises a second LED, and wherein the one or more non-transitory computer readable media store processor-executable instructions which, when executed by the one or more processors, cause the camera device to perform operations comprising:
 determining, based on second image data generated by the camera that corresponds to a second portion of the FOV of the camera, a second luma estimate value for a second channel associated with a second portion of the FOV of the camera,
 determining a second updated electrical current value based on the automatic exposure control luma target value, the automatic exposure control sensor gain value, the second luma estimate value for the second channel, and the gain target threshold, and
 modifying, based on the second updated electrical current value, an amount of current provided to a second LED associated with the second channel.

10. The camera device of claim 4, wherein the camera device comprises a video doorbell device.

11. The camera device of claim 4, wherein the first LED comprises an infrared LED.

12. The camera device of claim 4, wherein the first LED comprises a visible-light LED.

13. The camera device of claim 4, wherein the first portion of the FOV of the camera is less than an entirety of the FOV of the camera.

14. A camera device comprising:
 a first light emitting diode (LED);
 a camera having a field of view (FOV);
 one or more processors; and
 one or more non-transitory computer readable media storing processor-executable instructions which, when executed by the one or more processors, cause the camera device to perform operations comprising:
  determining an automatic exposure control luma target value,
  receiving image data generated by the camera at a first time, the image data comprising first image data and second image data, the first image data defined with reference to a first set of pixel locations representing a first portion of the FOV of the camera at the first time, and the second image data defined with reference to a second set of pixel locations representing a second portion of the FOV of the camera at the first time,
  determining, based on the first image data, a first luma estimate value for a first channel associated with the first portion of the FOV of the camera, and
  based on the automatic exposure control luma target value and the first luma estimate value for the first channel, modifying an amount of current provided to a first LED associated with the first channel.

15. The camera device of claim 14, wherein the one or more non-transitory computer readable media store processor-executable instructions which, when executed by the one or more processors, cause the camera device to perform operations comprising:
  determining a first value based on the first luma estimate value for the first channel and the automatic exposure control luma target value,
  determining a second value based on an automatic exposure control sensor gain value and a gain target threshold, and
  comparing the first value to the second value,
  wherein the modifying is based on the comparing of the first value to the second value.

16. The camera device of claim 14, wherein the one or more non-transitory computer readable media store processor-executable instructions which, when executed by the one or more processors, cause the camera device to perform operations comprising:
  determining a first value based on the first luma estimate value for the first channel and the automatic exposure control luma target value,
  determining a second value based on an automatic exposure control sensor gain value and a gain target threshold, and
  determining a third value based on the first value and the second value,
  wherein the modifying is based on the third value.

17. The camera device of claim 14, wherein the one or more non-transitory computer readable media store processor-executable instructions which, when executed by the one or more processors, cause the camera device to perform operations comprising:
  determining a first value based on the first luma estimate value for the first channel and the automatic exposure control luma target value,
  determining a second value based on an automatic exposure control sensor gain value and a gain target threshold, and
  determining a third value based on a division operation involving the first value and the second value,
  wherein the modifying is based on the third value.

18. The camera device of claim 14, wherein the one or more non-transitory computer readable media store processor-executable instructions which, when executed by the one or more processors, cause the camera device to perform operations comprising:
  determining a first value based on the first luma estimate value for the first channel and the automatic exposure control luma target value,
  determining a second value based on an automatic exposure control sensor gain value and a gain target threshold,
  determining a third value based on the first value and the second value, and
  determining an updated amount of current based on the third value,
  wherein the modifying is based on the updated amount of current.

19. The camera device of claim 14, wherein the camera device comprises a second LED, and wherein the one or more non-transitory computer readable media store processor-executable instructions which, when executed by the one or more processors, cause the camera device to perform operations comprising:
  determining, based on second image data generated by the camera that corresponds to a second portion of the FOV of the camera, a second luma estimate value for a second channel associated with a second portion of the FOV of the camera, and
  based on the automatic exposure control luma target value and the second luma estimate value for the second channel, modifying an amount of current provided to a second LED associated with the second channel.

20. The camera device of claim 14, wherein the first LED comprises an infrared LED.

* * * * *